US009990304B2

(12) United States Patent
Tomlin et al.

(10) Patent No.: US 9,990,304 B2
(45) Date of Patent: Jun. 5, 2018

(54) MULTIMODE STORAGE MANAGEMENT SYSTEM

(71) Applicant: Samsung Electronics Co., Ltd., Gyeonggi-do (KR)

(72) Inventors: Andrew Tomlin, San Jose, CA (US); Justin Jones, Burlingame, CA (US)

(73) Assignee: Samsung Electronics Co., LTD, Gyeonggi-Do (KR)

( * ) Notice: Subject to any disclaimer, the term of this patent is extended or adjusted under 35 U.S.C. 154(b) by 118 days.

(21) Appl. No.: 14/941,512

(22) Filed: Nov. 13, 2015

(65) Prior Publication Data

US 2017/0139837 A1 May 18, 2017

(51) Int. Cl.
*G06F 3/06* (2006.01)
*G06F 12/1009* (2016.01)

(52) U.S. Cl.
CPC .......... *G06F 12/1009* (2013.01); *G06F 3/061* (2013.01); *G06F 3/0611* (2013.01); *G06F 3/0626* (2013.01); *G06F 3/0644* (2013.01); *G06F 3/0652* (2013.01); *G06F 3/0659* (2013.01); *G06F 3/0661* (2013.01); *G06F 3/0664* (2013.01); *G06F 3/0688* (2013.01); *G06F 2212/1024* (2013.01); *G06F 2212/152* (2013.01); *G06F 2212/65* (2013.01)

(58) Field of Classification Search
CPC ............. G06F 12/0246; G06F 12/1009; H04L 67/1097
See application file for complete search history.

(56) References Cited

U.S. PATENT DOCUMENTS

| 8,639,669 | B1 | 1/2014 | Douglis et al. | |
|---|---|---|---|---|
| 2003/0023818 | A1 | 1/2003 | Archibald, Jr. et al. | |
| 2004/0030847 | A1* | 2/2004 | Tremaine | G06F 12/023 711/154 |
| 2008/0077728 | A1 | 3/2008 | Kim et al. | |
| 2010/0172180 | A1 | 7/2010 | Paley et al. | |
| 2010/0250839 | A1 | 9/2010 | Ito et al. | |
| 2011/0107018 | A1 | 5/2011 | Honda | |
| 2011/0161559 | A1 | 6/2011 | Yurzola et al. | |
| 2012/0096217 | A1 | 4/2012 | Son et al. | |
| 2012/0297122 | A1* | 11/2012 | Gorobets | G06F 12/0246 711/103 |
| 2013/0227198 | A1* | 8/2013 | Lee | G06F 12/0246 711/103 |
| 2014/0281126 | A1 | 9/2014 | Bleyer et al. | |
| 2014/0365719 | A1 | 12/2014 | Kuzmin et al. | |
| 2015/0058591 | A1* | 2/2015 | Kaiser | G06F 17/30581 711/170 |
| 2016/0124847 | A1* | 5/2016 | Malwankar | G06F 12/0253 2/253 |
| 2017/0017588 | A1 | 1/2017 | Frid et al. | |

* cited by examiner

Primary Examiner — Edward J Dudek, Jr.

(57) ABSTRACT

A storage system includes multiple storage devices that have first partitions with first type interfaces and second partitions with selective underlying exposure (SUE) interfaces. A selected underlying aspect of the second partition is exposed in the storage system. The storage system also includes a multimode storage management system that directs conveyance of information to the storage devices. The multimode storage management system includes a controller that directs activities of the second partitions via the SUE interfaces and the selected underlying aspect of the second partition.

18 Claims, 22 Drawing Sheets

800

---

810
Configuring portions of a device as a first region for storage of a first type of information.

820
Engaging in first type interface operations based upon first address space information.

830
Configuring portions of the device as a second region for storage of a second type of information.

840
Engaging in second type interface operations based upon second address space information; wherein the second type interface selectively exposes an underlying aspect.

FIG 8

MULTIMODE STORAGE MANAGEMENT SYSTEM

FIELD OF INVENTION

The present invention relates to the field of information storage.

BACKGROUND

Numerous electronic technologies such as digital computers, calculators, audio devices, video equipment, and telephone systems have facilitated increased productivity and reduced costs in most areas of business, science, education, and entertainment. These electronic systems typically include operations that involve information storage systems. The speed and ease at which the information storage operations proceed can have a significant impact on overall performance. However, conventional attempts at information storage typically involve an inverse relationship between speed and manageable complexity.

Information storage systems typically involve operations that can fall into one of two categories. One category involves storage operations associated with user initiated activities. The other category involves management and maintenance activities that are typically initiated by the system. The speed and ease at which these operations proceed often corresponds to the type of address space utilized to store the information. Traditional attempts at utilizing a physically addressed space are theoretically considered to operate at a very fast speed but attempts at actual management and maintenance operations in conventional physically addressed space are very complex and not practically implemented. Management and maintenance of conventional logical address space is generally considered to involve less complexity than a physical address space. However, a conventional logical address space does not operate as fast as a physical address space. While conventional storage systems may operate at levels that may have previously been considered tolerable, they are increasingly inadequate to meet the requirements and long felt need for improved applications and platforms. Conventional attempts at achieving both the increased speed and manageable complexity to enable improved system development have not been successful.

SUMMARY

According to one embodiment of the present invention, a storage system includes multiple storage devices that have first partitions with first type interfaces and second partitions with selective underlying exposure (SUE) interfaces. A selected underlying aspect of the second partition is exposed in the storage system. The storage system also includes a multimode storage management system that directs conveyance of information to the storage devices. The multiple mode storage management system includes a controller that directs activities of the second partitions via the SUE interfaces and the selected underlying aspect of the second partition.

According to another embodiment of the present invention, a computer-implemented method for managing storage media in an array of storage devices associated with a storage system includes mapping user data into a SUE address space that corresponds to a representative geometry of a physical storage area in the array of storage devices associated with the storage system.

According to yet another embodiment of the present invention, a system for managing storage media in an array of storage devices associated with a storage system includes a memory that stores machine instructions and a processor that executes the instructions to map user data into a SUE address space. The SUE address space corresponds to a representative geometry of a physical storage area in the array of storage devices associated with the storage system.

The details of one or more embodiments of the invention are set forth in the accompanying drawings and the description below. Other features, objects, and advantages of the invention will be apparent from the description and drawings, and from the claims.

DESCRIPTION OF THE DRAWINGS

The accompanying drawings, which are incorporated in and form a part of this specification, are included for exemplary illustration of the principles of the present invention and not intended to limit the present invention to the particular implementations illustrated therein. The drawings are not to scale unless otherwise specifically indicated.

FIG. 8 is a flow chart of multimode underlying exposure drive method in accordance with one embodiment.

DETAILED DESCRIPTION

Reference will now be made in detail to embodiments of the invention, examples of which are illustrated in the accompanying drawings. While the invention will be described in conjunction with some embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Efficient and effective multimode storage approaches that can include multiple different types of address spaces and address space activities are described. In one embodiment, a multimode selective underlying exposure (SUE) storage device enables selective exposure of some underlying aspects of the storage device while not exposing other underlying aspects. A multimode storage and SUE approach can facilitate both improved performance while limiting complexity to a manageable scope. In one exemplary implementation, an underlying aspect of a physical address space is selectively exposed. An overall storage hierarchical approach can be implemented and underlying aspects from one hierarchical level are selectively exposed to another hierarchical level. The selective exposure can occur through address space configurations and mapping between address spaces. The selectively exposed underlying aspect can facilitate more efficient and effective implementation of various activities at a hierarchical level that is different than the hierarchical level at which the exposed underlying aspect resides. The activities can include storage management operations. It is appreciated that multimode storage and SUE approaches can include a variety of configurations and implementations.

A Multimode Storage Device

Figure 1:
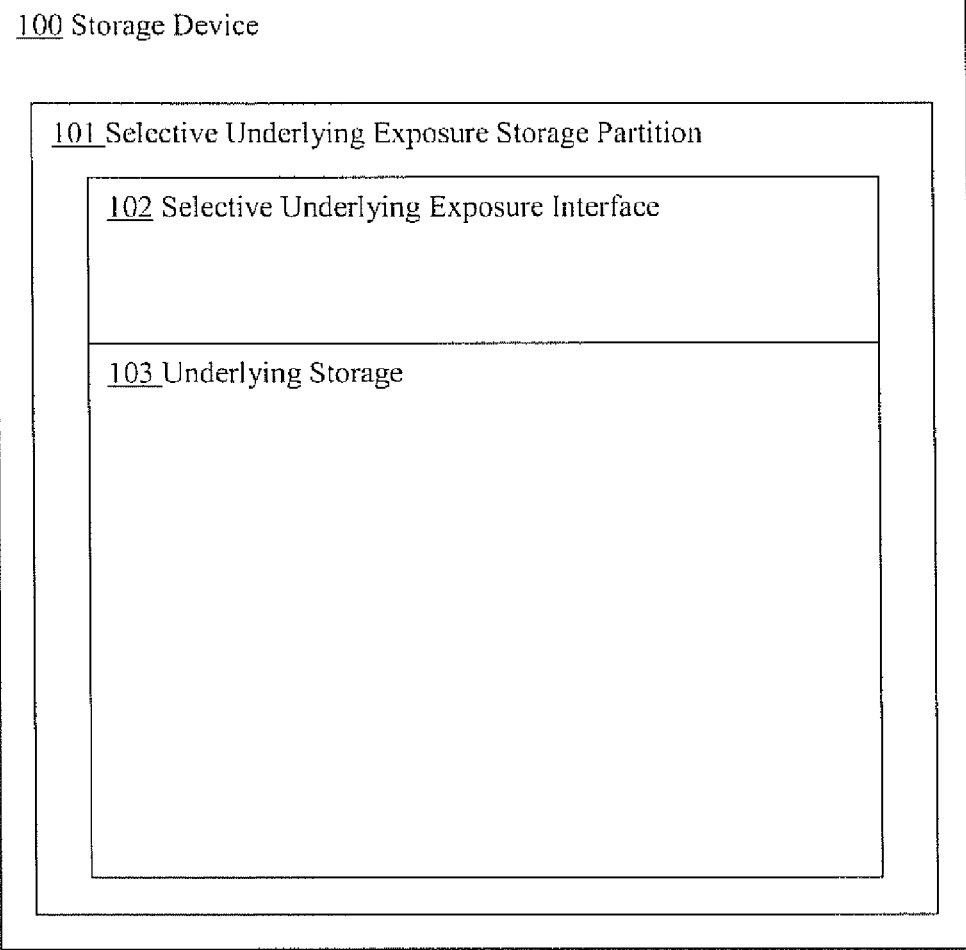
FIG. 1 is a block diagram of an exemplary storage device with a SUE storage partition in accordance with one embodiment.

FIG. 1 is a block diagram of an exemplary storage device 100 with a selective underlying exposure (SUE) storage partition 101 in accordance with one embodiment. SUE storage partition 101 includes a selective underlying exposure (SUE) interface 102 and underlying storage region 103. The underlying storage region 103 stores information and the SUE interface 102 enables selective exposure of an aspect (e.g., characteristic, feature, and function) of the underlying storage region itself (e.g., physical aspects related to dimensions, representative geometry, management functions, write operations, and erase operations) to an external component or storage system hierarchical level (not shown). The exposure can be associated with aspects of the information stored in underlying storage region 103 (user data and metadata). The SUE storage partition 101 can expose a portion of the underlying aspects (e.g., characteristics, features, and functions).

In one exemplary implementation in which a portion of the underlying aspects are exposed, an activity (e.g., free space management, reclamation and conditioning for free space use, over-provisioning, trim operations, and power cycling) the exposed aspects are associated with is performed more efficiently (e.g., faster, less bandwidth, and improved power consumption) than a system that does not selectively expose a portion of the underlying aspect. The activity can be performed with less complexity than an approach that exposes more or all of the underlying aspects. In one embodiment, the selection of which portion of the underlying aspects that are exposed is based upon a comparison or balancing of speed versus complexity. It is appreciated that the SUE storage partition 101 can be included in a single mode storage device with a single partition or the SUE storage partition can be included in a multimode storage device with a plurality of partitions.

Figure 2:
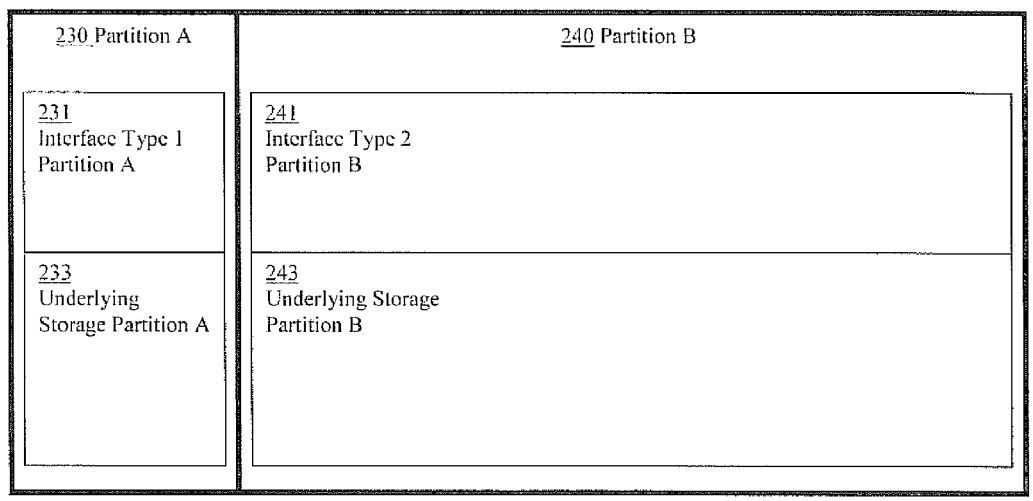
FIG. 2 is a block diagram of an exemplary multimode storage device in accordance with one embodiment.

FIG. 2 is a block diagram of an exemplary multimode storage device 220 in accordance with one embodiment. Storage device 220 includes a first partition 230 and a second partition 240. It is appreciated that the multiple modes and corresponding partitions can be associated with or based upon a variety of things. The various things can include different exposures of underlying storage, different address spaces (e.g., logical, virtual, and physical), different storage management modes (e.g., internal management and external management), different underlying stored information (e.g., metadata and user data), and so on. The internal management and external management can include storage device management system components and operations (e.g., flash management system (FMS) and solid state device management system). The partitions and corresponding components can also be different types.

Partitions and corresponding interfaces in a multimode storage device can be associated with different types of address spaces (e.g., logical address space and selective underlying exposure (SUE) address space). More than one partition and corresponding interface in a multimode storage device can also be the same type of address space (e.g., more than one partition and corresponding interface in a multimode storage device can be SUE address spaces). First partition 230 includes a first type of interface 231 and an underlying storage region 233. Second partition 240 includes a second type of interface 241 and an underlying storage region 243. In one embodiment, a first partition 230 is a first type of address space partition (e.g., logical address space partition) and a second partition 240 is a second type of address space partition (e.g., SUE address space and virtual address space). It is appreciated a partition can be a SUE storage partition.

Figure 3:
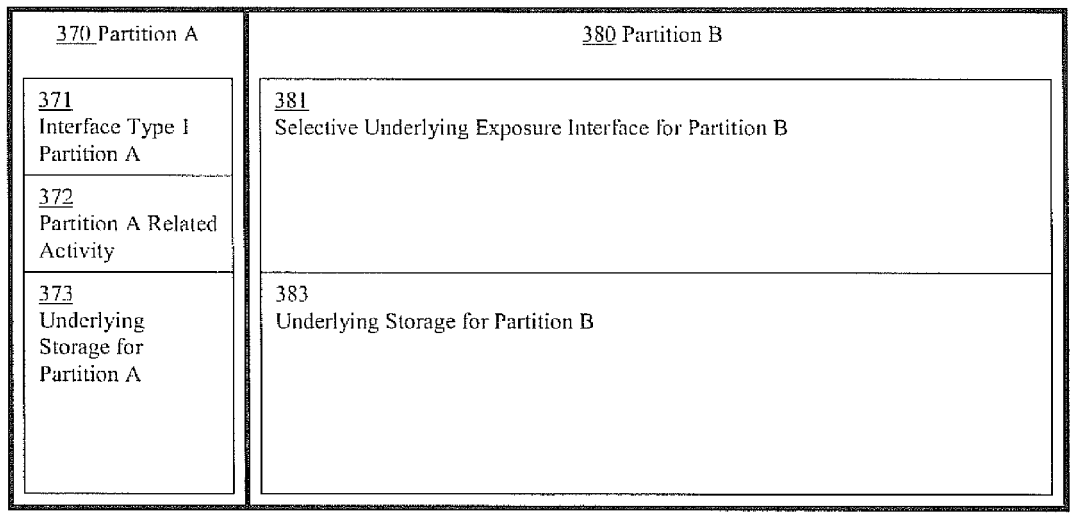
FIG. 3 is a block diagram of another exemplary multimode storage device in accordance with one embodiment.

FIG. 3 is a block diagram of another exemplary multimode storage device 350 in accordance with one embodiment. Storage device 350 includes a first partition 370 and a second partition 380. In one embodiment, first partition 370 is a first type of address space partition and second partition 380 is a SUE address space partition. First partition 370 includes a first type of interface 371 and an underlying storage region 373. Second partition 380 includes a SUE interface 381 and an underlying storage region 383. It is appreciated that some activities, such as first partition related activities 372 (e.g., FMS) can be performed for one partition internally (e.g., in the storage device) and externally (not shown) for the other partition.

Different types of information can be stored in the different partitions. In one embodiment, there are two types of information, metadata and user data. User data is primarily generated by user applications and metadata is primarily auxiliary information associated with the user data (e.g., location of file in a storage system hierarchy, size of content in a file, access time, modify time, and user ID). A first flash management system is focused on managing the metadata. The metadata in turn is used to manage storage of the user data.

It is appreciated that a storage system can direct or implement operations associated with user initiated activities differently than system operations associated with management or maintenance activities. For example, a user initiated read or write can be directed to a particular address or location from a user perspective while system operations can be directed to physical blocks and pages from a system perspective. It is also appreciated that a storage device can include a variety of configurations and implementations. In one embodiment, a storage device is a solid state device. The storage device can include flash components (e.g., NAND type flash components and NOR type flash components).

Figure 4:
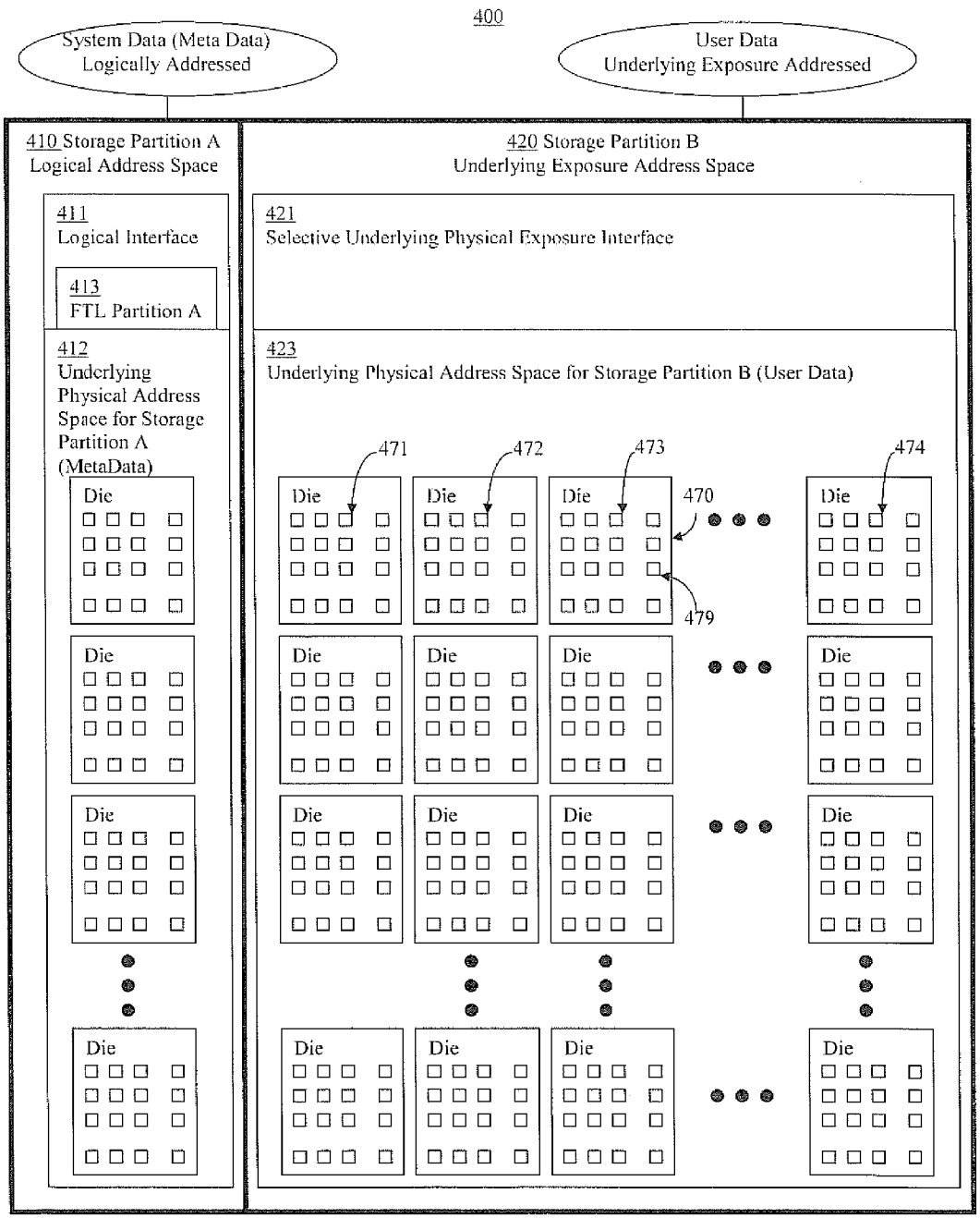
FIG. 4 is a block diagram of exemplary multimode solid state drive (MM-SSD) in accordance with one embodiment.

FIG. 4 is a block diagram of exemplary multimode solid state drive (MM-SSD) 400 in accordance with one embodiment. Multimode solid state drive (SSD) 400 may be one exemplary implementation of a multimode storage device. Multimode solid state drive 400 includes a logical address space partition 410, logical interface 411 that can include flash translation logic FTL 413, an underlying physical address space 412, a SUE address space partition 420, a SUE interface 421, and an underlying physical address space 423. The logical address space partition 410 can receive and store system data (e.g., metadata) that is logically addressed and the selective underlying address space partition 420 can receive user data (e.g., application data) that is addressed in accordance with an underlying exposure address space. The user data is stored in underlying physical address space 423 which can include flash storage components (e.g., different types of floating gate transistors). The flash storage components can be arranged in a variety of configurations and granularities. For example, the flash storage components can be arranged as a plurality of dies and a die 470 with blocks 473 and 479 and pages within the blocks.

In one embodiment, SUE interface 421 exposes an aspect of underlying physical address space 423. Selective aspects of underlying physical address space 423 are exposed by coordination of user data addressing with underlying operations of MM-SSD 400 physical address space 423. The coordination can correspond to exposure of management operations of the underlying physical address space. The underlying physical storage management aspect can include a grouping of a plurality of underlying physical address blocks (e.g., 471, 472, 473, and 474) that are managed together (e.g., in a single operation, as a single management unit, in a block set, in a band, and in response to single management command).

Figure 5:
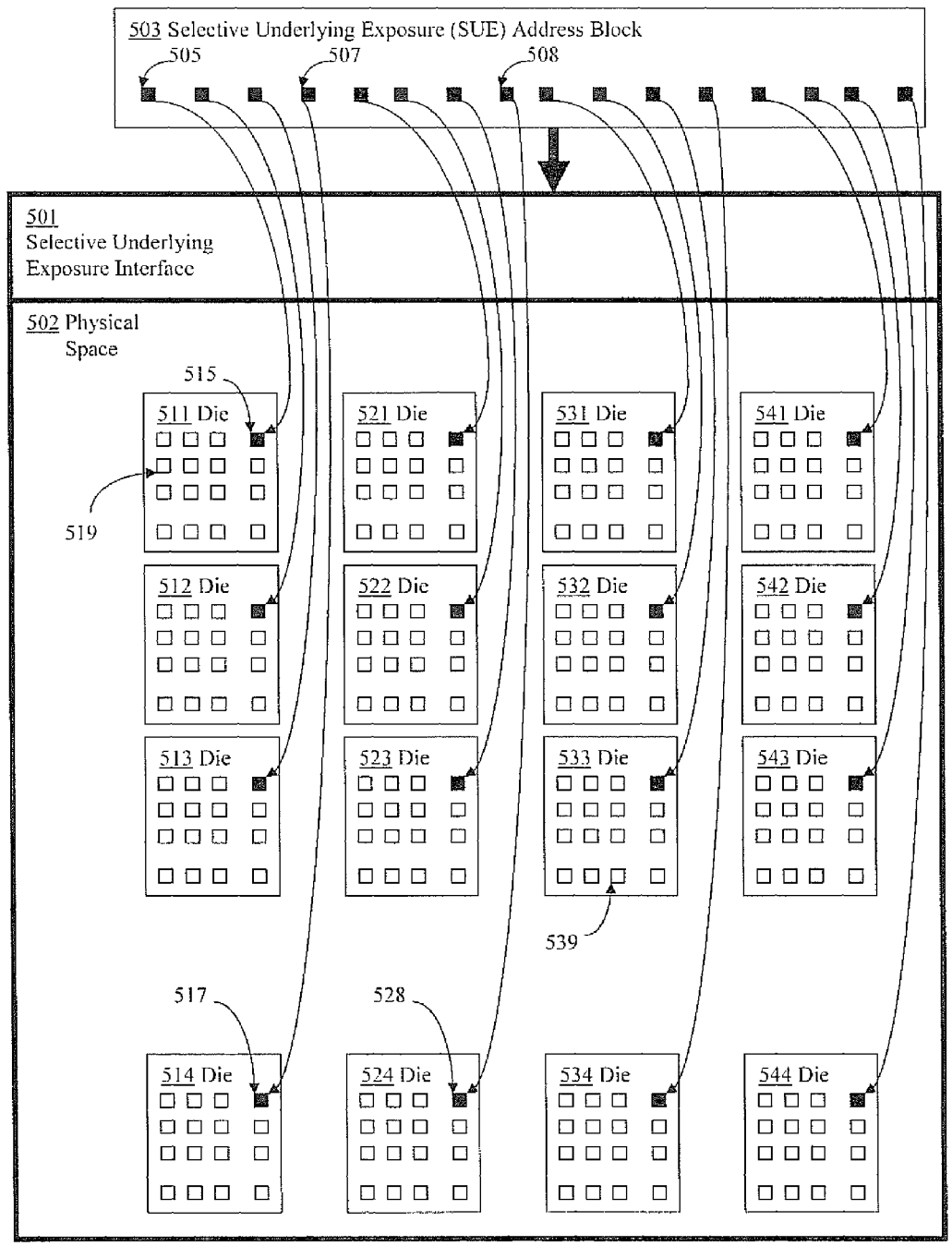
FIG. 5 is a block diagram illustrating an exemplary translation of address space information to logical address space information in accordance with one embodiment.

FIG. 5 is a block diagram illustrating an exemplary translation of address space information to logical address space information in accordance with one embodiment. SUE address block 503 includes information associated with various management and maintenance operations (e.g., 505, 507, and 508). Physical address space 502 includes a plurality of dies (511, 512, 513, 514, 521, 522, 523, 524, 531, 532, 533, 534, 541, 542, 543, and 544). Each die includes a plurality of physical addressed blocks (e.g., 515 and 519) and each physical addressed block includes a plurality of physical address pages.

Physical address space 502 accesses address storage locations on a physical block and physical page basis. A SUE type interface 501 receives selective underlying exposure (SUE) address space block 503 information and translates or reconfigures the information into configurations compatible with physical address space 502. The SUE address block 503 information corresponds to the information involved in a physical management operation. In one embodiment, management and maintenance operations are directed to physical blocks (e.g., physical block 515, 519, and 539) in physical space 502. A management operation can be directed to a physical address space or physical level management unit. The physical level management unit can include managing a plurality of addresses, pages, blocks, and so on that are managed at substantially the same time (e.g., in response to a management operation or command). For example, an erase operation can be directed to a physical block (shown in black similar to block 515) from each die. As the SUE address block is configured to match the physical block, each piece of information (e.g., 505, 507, and 508) for each corresponding physical block is included in the SUE address space block 503. In one exemplary implementation, SUE interface 501 receives SUE address space block 503 information, identifies information 505, 507, and 508 as corresponding to physical blocks 515, 517, and 528 respectively, and performs the corresponding management and maintenance operations accordingly. In one embodiment, erase management operations are performed on information in a plurality of physical blocks and write operations are performed on information in a page.

The geometries of the two address spaces can also be different. In one embodiment, a logical address space is a single dimension (e.g., how the logical block address (LBA) offset is aligned). A physical address space is multidimensional, including various aspects such as error correction code (ECC), physical page, physical block, physical die, and so on (including some or a subset thereof). The SUE address space can be one dimensional or a limited or reduced number of dimensions. In one exemplary implementation of the SUE address space, dimensions of an underlying physical address space are abstracted into a single or reduced number of dimensions. Selected dimensions (e.g., block and page) associated with a management activity (e.g., reclamation/garbage collection and power cycling) of the underlying physical address space are abstracted into a SUE address space while other aspects or activities (e.g., ECC) of the underlying physical address space are not abstracted into the SUE address space.

Figure 6:
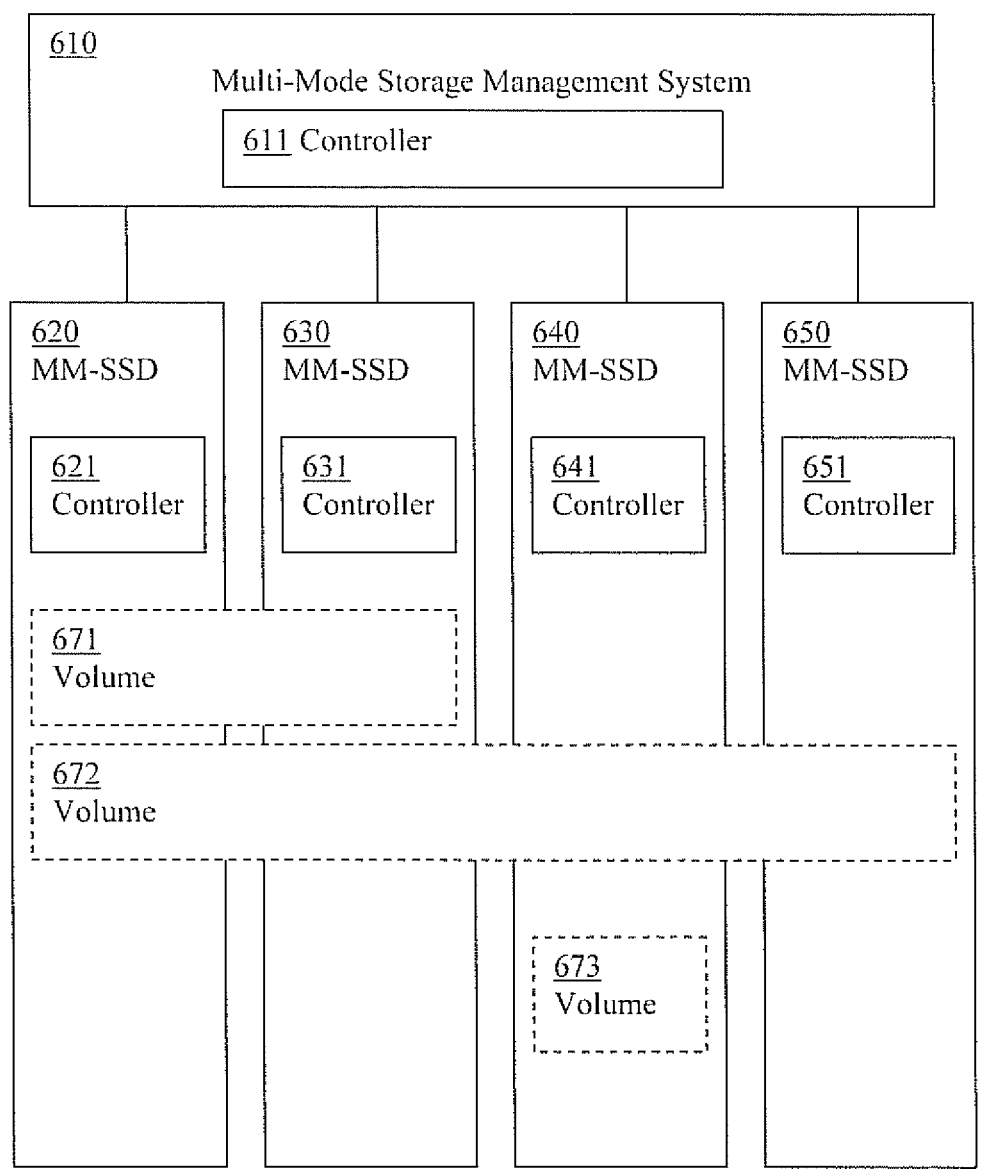
FIG. 6 is a block diagram of an exemplary system in accordance with one embodiment.

It is appreciated that, selective exposure of an underlying aspect can include coordination prior to delivery of the user data to MM-SSD 400 performed by other components (not shown) in the overall system rather than the MM-SSD. In one embodiment, a MM-SSD can be coupled to a management component operating at a different level of an overall system hierarchy. FIG. 6 is a block diagram of system 600 in accordance with one embodiment. System 600 includes a plurality of MM-SSDs (e.g., 620, 630, 640 and 650) communicatively coupled to multimode storage management system 610. It is appreciated that some activities (e.g., some storage management operations and flash management system operations) can be controlled by multimode storage management system 610 and other activities (e.g., other storage management operations and flash management system operations) can be controlled by the multimode MM-SSDs 620, 630, 640, and 650 respectively. In one embodiment, MM-SSDs 620, 630, 640, and 650 include controllers 621, 631, 641, and 651 respectively that control or direct some activities for MM-SSDs 620, 630, 630, and 650 while multimode storage management system 610 includes controller 611 that controls or directs some activities for MM-SSDs 620, 630, 640, and 650. In one exemplary implementation, controllers 621, 631, 641, and 651 control or direct activities of the first partitions in MM-SSDs 620, 630, 640, and 650 respectively, and controller 611 controls or directs activities of the second partitions in MM-SSDs 620, 630, 640, and 650. Controller 611 can control the activities in the MM-SSDs 620, 630, 640, and 650 via selective underlying exposure interfaces.

In one embodiment, system 600 includes multiple volumes (e.g., 671, 672, and 673). In one exemplary implementation, the system includes a user space and the user space is mapped into multiple volumes and the storage space is presented to the user as the multiple volumes. It is appreciated that the volumes can be different sizes. It is also appreciated that the different size SUE addressable units can be associated with the multiple volumes.

Figure 7:
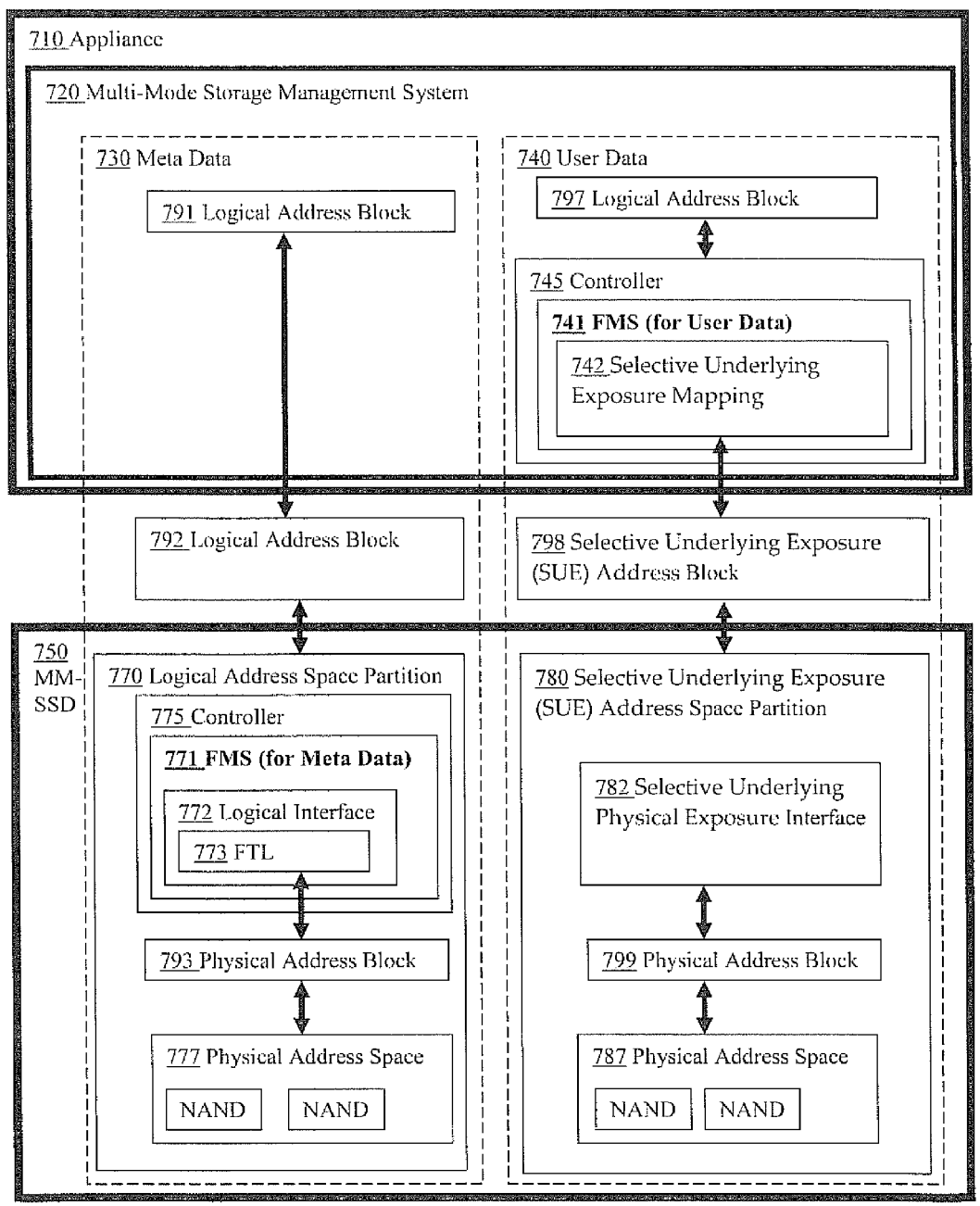
FIG. 7 is a block diagram of system in accordance with one embodiment.

FIG. 7 is a block diagram of system 700 in accordance with one embodiment. System 700 includes a multimode SSD (MM-SSD) 750 communicatively coupled to multimode storage management system 720 included in appliance 710. It is appreciated that other multimode SSDs can be coupled to multimode storage management system 720. System 700 manages storage of metadata 730 and user data 740. Multimode storage management system 720 includes a controller 745. Controller 745 includes flash management system 741 (for user data) and SUE mapping 742. Multi-Mode SSD 750 includes logical address space partition 770 and SUE address space partition 780. Logical address space partition 770 includes physical address space 777 and a controller 775 that includes flash management system 771 (for metadata). Flash management system 771 can include logical interface 772, which in turn can include FTL 773. Physical address space 777 can include NAND flash. Underlying exposure address space partition 780 includes SUE interface 782 and physical address space 787, which can include NAND flash.

Metadata 730 information is received in logical address blocks 791 and forwarded in logical address blocks 792 from multimode management system 720 to logical address space 770. It is appreciated that logical address blocks 791 and 792 can be identical (e.g., logical address blocks 791 is unchanged and simply forwarded logical address space 770). Logical interface 772 translates the logical block address (LBA) associated with the metadata to a physical address block 793 associated with physical address space 777. FMS 771 directs storage management and maintenance operations associated with physical address space 777. The metadata is stored in NAND flash of physical address space 777.

User data in logical address blocks 797 is forwarded to FMS 741. As underlying features and characteristics of physical address space 787 are exposed via SUE interface 782, FMS 741 directs flash management system and maintenance operations associated with underlying features and characteristics of physical address space 787. A SUE mapping component 742 maps the logical address block 797 to SUE address block 798, which is in turn translated by selective underlying interface 782 to a physical address block 799 (e.g., similar to 517 and 519 in FIG. 5) associated with NAND flash components included in physical address space 787. It is appreciated that the logical address block can be a different size than the SUE address block, which in turn can be a different size than the physical address block.

Performing various activities in the hierarchy level above facilitates more efficient and convenient management than conventional approaches. Conventional approaches are often limited in their flexibility in dealing with activities that impact multiple layers. Some conventional approaches must perform an activity on multiple levels resulting in exponential adverse impacts on overall performance (e.g., log-on-log, FMS at drive level and FMS at system level). For example, in a raid storage system there are a number of items that need to managed together (e.g., data storage and corresponding parity storage) that have impacts at both an upper storage hierarchy level (e.g., raid system management level) and a lower storage hierarchy level (e.g., storage drive level). The lifecycle of information may be different for each level (e.g., a user may want to overwrite the information but the raid system may still need it for parity recalculation) resulting in a drive FMS writing "new" data for a user but the system FMS still keeping the "old" information for the raid system. This results in write amplification being 1/(OPdrive) (OPsystem) without the ability to do trim.

FIG. 8 is a flow chart of multimode selective underlying exposure (MM-SUE) drive method 800 in accordance with one embodiment. In a drive with over provisioning (e.g., SSD) of 7%, the drive is working 15 times harder than a direct overwrite system without drive over provisioning (e.g., HDD) and also another 15 times harder for a system without system over-provisioning for a total of 225 (15×15) times harder. The multimode storage device that allows the FMS to be moved up to the upper level facilitates a reduction back down (e.g., for 7% just 15 times harder range, and for 28% just 3 times harder range) resulting in a reduction of write amplification. In one exemplary implementation, the selected underlying address block and pages used to direct management operations from the upper level are coordinated with or match the underlying physical level and allow the user and system lifecycles to differ, but from a management standpoint the lifecycles are aligned (e.g., can correspond the use and erasure of the user space).

In block 810, a first portion of a device is configured or designated as a first region for storage of a first type of information. In one embodiment, the first region is a metadata region and the first type of information is metadata. The error correction code (ECC) size can be varied.

In block 820, first type interface operations are performed based upon first address space type information. In one exemplary implementation, the first region is a metadata region and the first type of information is metadata. In one embodiment, the first address type interface is a logical address space interface and operations are performed based upon logically addressed information. The logical interface operations can include flash translation logic (FTL) comprising: receiving metadata and logical addresses; and translating between address blocks visible at a system level configuration to address blocks at the physical level configuration.

In block 830, a second portion of a device is configured or designated as a second region for storage of a second type of information. In one embodiment, the second region is a user data region and the second type of information is user data. A SUE address space abstracts or removes complexity associated with the physical address space while still exposing a relationship or correspondence with the underlying physical address space configuration. In one exemplary implementation, the physical space dimensions are abstracted into a SUE address page dimension and SUE address block dimension. The physical address space is abstracted by a SUE address.

In block 840, second type interface operations are performed based upon second address space information, wherein the second type interface selectively exposes an underlying aspect. The second address space information can be selective underlying exposure (SUE) address space information, wherein the SUE address space information corresponds to an underlying aspect. The underlying aspect can include a representative geometry or dimension of a physical address space geometry. The SUE interface can expose dimensions associated with underlying system management operations (e.g., free space management, reclamation and conditioning for free space use). The percentage of over provisioning in metadata region is different than the percentage of over provisioning in user data region.

Figure 9:
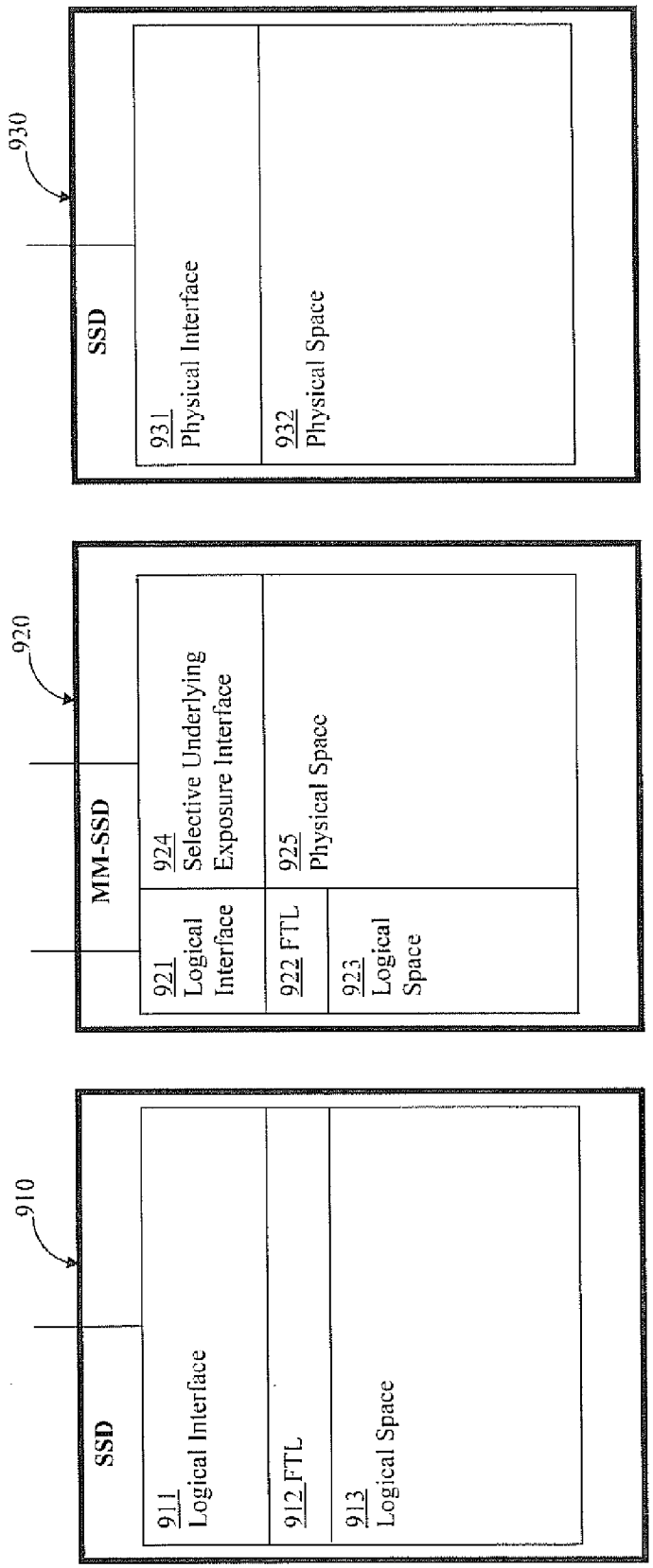
FIG. 9 is a block diagram of an exemplary multimode SSD device in contrast to conventional attempts at a logical SSD approach and a physical SSD approach.

FIG. 9 is a block diagram of exemplary multimode SSD device 920 in contrast to conventional attempts at a logically addressed SSD 910 and a physically addressed SSD 930. Logically addressed SSD 910 includes logical interface 911, FTL 912, and logical address space 913. Physically addressed device 930 includes physical interface 931 and physical address space 932. Multimode SSD 920 includes logical interface 921, FTL 922, logical space 923, SUE interface 924, and physical space 925.

Multimode SSD 920 facilitates convenient and selective exposure of underlying aspects of the drive. The multimode SSD 920 allows an appropriate amount of exposure without undue complexity unlike conventional approaches that either do not expose enough or have too much complexity. However conventional SSDs are not typically a nice linear address space in reality, rather they usually have a controller with a bunch of flash chips with dies configured to operate in blocks made up of pages that have the data to be stored in groups or strings of transistors. Physically addressed device 930 tries to expose all of the underlying physical address aspects of the storage medium allowing what is considered very fast operations (e.g., compared to logically addressed SSD 910) but gives rise to a very complex approach. Logical SSD 910 has what is considered a single linear flat mapping space with a scheme that hides away all or nearly all the underlying details of aspects of the storage medium, however trying to store the data ultimately in a physical region with many of the underlying details hidden slows the system down (e.g., compared to physically addressed SSD 930).

Multimode SSD 920 facilitates convenient and flexible configuration and implementation of FMS operations. Multimode SSD 920 primarily performs FMS operations in an internal controller of multimode SSD 920 for logical space 923 while FMS operations for SUE address space 925 are primarily performed at a system level in a controller external to multimode SSD 920. This ability to split or divide FMS operations of the multimode SSD 920 is unlike FMS operation approaches used for SSD 910 and SSD 930 that do not allow a split or division of FMS operations. FMS operations for logical SSD 910 are primarily performed in a controller of logical SSD 910 while FMS operations for physical SSD 930 are primarily performed at a system level in a controller external to physical SSD 930. In one embodiment, multimode SSD 920 selectively exposes some underlying address space features and SSD 910 and SSD 930 do not facilitate selective exposure of some underlying address space features and not others. In one embodiment, the exposure of the underlying aspect to an external FMS involves mapping of the selected exposure of the underlying aspect.

Selective Underlying Exposure (SUE) Mapping

Another embodiment of the present invention implements a selective underlying exposure (SUE) mapping scheme to create a mapping from a logical address space to a SUE address space for user data in a storage system. The SUE mapping scheme selectively exposes significant features of the underlying physical storage media in order to permit certain storage media management functions to be performed at a system level across multiple storage devices rather than at an individual storage device level.

For example, an embodiment enables selective exposure of aspects of a user address space across multiple NAND flash nonvolatile memory devices in a storage appliance. The SUE pages and blocks of the SUE mapping scheme are aligned with corresponding physical pages and blocks that are jointly managed as a unit in each of the physical NAND flash nonvolatile memory devices. Individual dies in the physical NAND flash nonvolatile memory devices are not distinguished in the SUE mapping scheme, but nonetheless are indirectly reflected in the SUE block size.

The correlation between the physical pages and blocks of the storage devices and the SUE pages and blocks of the SUE mapping scheme allows certain NAND flash management functions, such as erasures, programming, reclamation (garbage collection) and free space management, to be coordinated and implemented at a system level across all NAND flash nonvolatile memory devices in the storage system. The system-level implementation of certain storage media management functions can provide advantageous efficiencies regarding storage resource provisioning.

Referring again to FIG. 3, a multimode storage device (e.g., 350, 400, 620), such as a NAND flash nonvolatile memory device, may be implemented in conjunction with the SUE mapping scheme described in this disclosure. For example, in some embodiments the multimode storage device is a NAND flash-based solid-state drive (SSD). In some embodiments, the multimode storage device conforms to a standardized physical form factor, such as a standard disk drive form factor or a standard memory card form factor.

Referring again to FIG. 5, as described above, a multimode storage device can include multiple dies 511, 512, 513, 514, 521, 522, 523, 524, 531, 532, 533, 534, 541, 542, 543, and 544, or memory chips, with a number of NAND flash memory cells. The NAND flash memory cells on each die are subdivided into multiple discrete physical blocks of memory cells, such as physical blocks 515, 517, 519, 528, and 539.

Erasures and management of free space generally are performed with respect to blocks of memory cells on one or more discrete groupings of dies on the multimode storage device. For example, a multimode storage device may include one hundred twenty-eight dies, and may erase and manage free space with respect to one block from each of the one hundred twenty-eight dies as a group or unit. Alternatively, multimode storage device 350 may include one hundred twenty-eight dies, and may erase and manage free space with respect to one block from a subset of the dies as a group, for example, a grouping of thirty-two dies.

Figure 10:
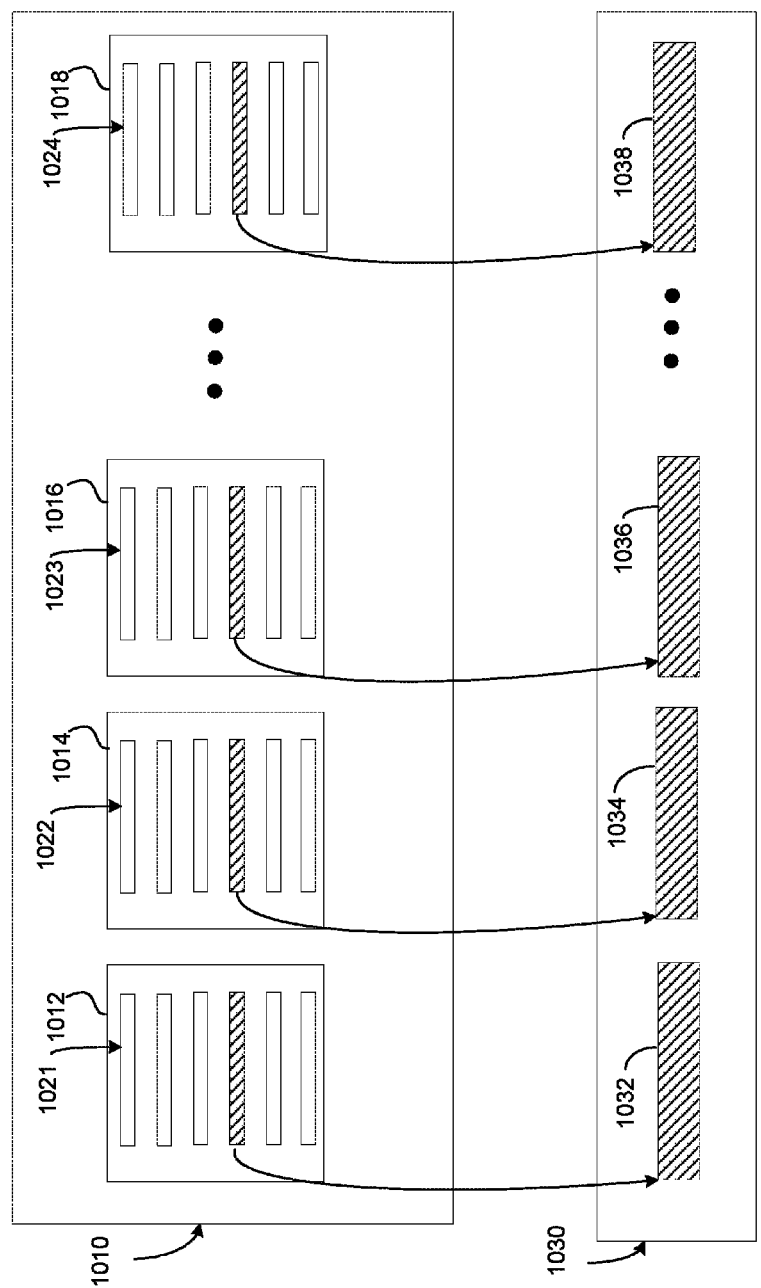
FIG. 10 is a block diagram depicting an exemplary SUE block and a corresponding SUE page for storage in the user area of a multimode storage device in accordance with an embodiment of the present invention.

Referring now to FIG. 10, a sequence of physical blocks 1012, 1014, 1016, and 1018 are shown that form a SUE block 1010. Each physical block of memory cells 1012, 1014, 1016, and 1018 is further subdivided into multiple discrete physical pages (e.g., 1021, 1022, 1023, and 1024) of memory cells. A SUE page 1030 includes a corresponding physical page 1032, 1034, 1036, and 1038 from each physical block 1012, 1014, 1016, and 1018 in the corresponding SUE block 1010.

In an embodiment of the present invention, a SUE configuration of the memory cells in the multimode storage device (e.g., 350, 400, or 620) is created. SUE pages and SUE blocks are organized with respect to each grouping of dies on the storage device that are jointly managed as a unit with respect to programming and erasures. SUE blocks are defined to include one physical block of memory cells from each die of a subset of dies in the multimode storage device that are jointly erased and managed as a unit. SUE pages are defined to include discrete sections or segments of a SUE block that are jointly programmed.

For example, in an embodiment the multimode storage device has one hundred twenty-eight dies, and jointly erases and manages free space on a respective physical block from each die. The corresponding SUE block 1010 is defined to include one hundred twenty-eight respective physical blocks of memory cells from the multimode storage device. The corresponding SUE page 1030 is defined to include one hundred twenty-eight respective sections or segments corresponding to the respective physical blocks.

In another embodiment, the multimode storage device has one hundred twenty-eight dies and, for example, jointly erases and manages free space on a respective physical block from thirty-two dies at a time. The corresponding SUE block 1010 is defined to include thirty-two respective physical blocks of memory cells from the multimode storage device. In this case, the corresponding SUE page 1030 is defined to include thirty-two respective sections or segments corresponding to the respective physical blocks.

In yet another embodiment, the multimode storage device has one hundred twenty-eight dies divided into four planes, and manages free space on a respective four-plane block from each die. The corresponding SUE block 1010 is defined to include one hundred twenty-eight respective four-plane blocks of memory cells from the memory device. In this case, the corresponding SUE page 1030 is defined to include one hundred twenty-eight respective sections or segments corresponding to the respective four-plane blocks.

Figure 11:
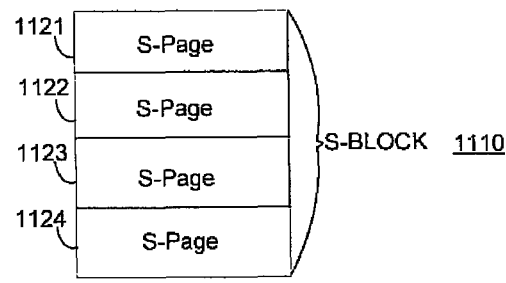
FIG. 11 is a block diagram depicting an exemplary SUE block of user storage space and corresponding SUE pages for storage in the user area of a multimode storage device in accordance with an embodiment of the present invention.

Referring now to FIG. 11, an exemplary SUE block (S-Block) 1110 of user storage space is represented as a block diagram. In one embodiment, SUE block 1110 can be considered similar to a virtual block (V-Block). The SUE block 1110 is the basic unit of memory media management at the individual storage device level. The SUE block is composed of multiple SUE pages (S-Pages). In one exemplary implementation, SUE pages can be considered similar to virtual pages (V-Pages). For example, the SUE block 1110 depicted in FIG. 11 includes four SUE pages (S-Pages) 1121, 1122, 123, and 1124.

As depicted in FIG. 5, the physical memory cells allotted to a SUE page (S-Page) in a SUE block (S-Block) are located in corresponding physical pages and physical blocks across multiple dies in a single multimode storage device (e.g., 350, 400, or 620). Alternative embodiments include blocks that are divided into any number of pages based on the relationship between the physical erasure block size and the programmable physical page size of the multimode storage device.

Figure 12:
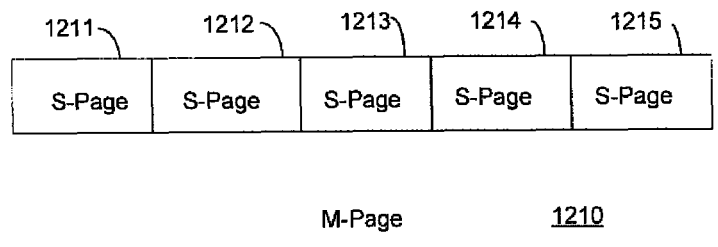
FIG. 12 is a block diagram depicting an exemplary SUE metapage and corresponding SUE pages for storage in the user area of a multimode storage device in accordance with an embodiment of the present invention.

Referring now to FIG. 12, an exemplary metapage (MPAGE) 1210 is represented as a block diagram. The metapage 1210 is composed of multiple SUE pages (S-Pages) across multiple storage devices in a storage system. For example, the metapage 1210 depicted in FIG. 12 includes five SUE pages (S-Pages) 1211, 1212, 1213, 1214, and 1215. Alternative embodiments include metapages that are divided into any number of SUE pages based on the number of individual multimode storage devices in the storage system and the number of dies jointly managed as a unit in each of the multimode storage devices.

The physical memory cells allotted to each SUE page are located in an individual multimode storage device (e.g., 350, 400, or 620). The memory cells allotted to the various SUE pages 1211, 1212, 1213, 1214, and 1215 that form a metapage 1210 are located in multiple storage devices (e.g., 620, 630, 640, and 650) associated with a storage system, for example, a storage appliance.

Thus, while the size or width of the SUE pages 1121, 1122, 1223, and 1124 correspond to the number of dies that are jointly managed as a unit in each multimode storage device, the size or width of the metapage 1210 corresponds to the number of multimode storage devices included in the storage system.

Figure 13:
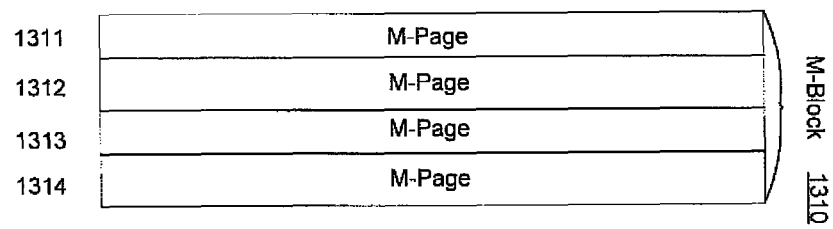
FIG. 13 is a block diagram depicting an exemplary SUE metablock and corresponding SUE metapages for storage in the user area of a multimode storage device in accordance with an embodiment of the present invention.

Referring to FIG. 13, an exemplary metablock (M-Block) 1310 is represented as a block diagram. The metablock (M-Block) 1310 is composed of multiple metapages 1311, 1312, 1313, and 1314. As with the metapage (M-Page) 1210, the physical memory cells allotted to a metablock (M-Block) 1310 are located in multiple storage devices associated with a storage system. That is, a metablock (M-Block) 1310 includes a respective block from each die in corresponding subsets of dies that are jointly managed as a unit in each multimode storage device (e.g., 620, 630, 640, and 650) in a storage system. Thus, the size of the metablock 1310 corresponds to the number of dies that are jointly managed in each multimode storage device (e.g., 350, 400, or 620) and the number of multimode storage devices (e.g., 620, 630, 640, and 650) included in the storage system.

Figure 14:
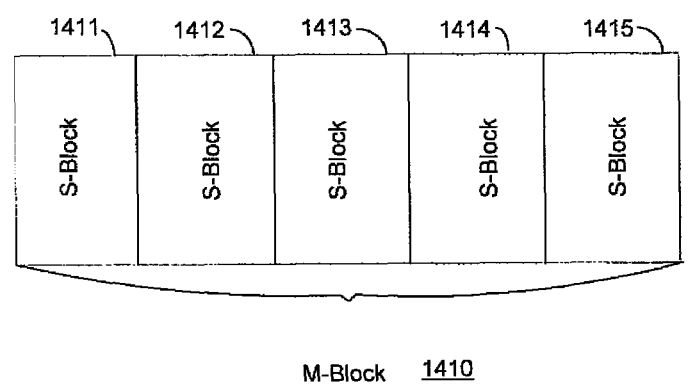
FIG. 14 is a block diagram depicting another exemplary SUE metablock and corresponding SUE blocks for storage in the user area of a multimode storage device in accordance with an embodiment of the present invention.

Referring to FIG. 14, the exemplary metablock (M-Block) 1410 can be represented as a block diagram composed of multiple SUE blocks (S-Blocks) 1110. The metablock 1410 is an aggregation of respective SUE blocks 1411, 1412, 1413, 1414, and 1415 from each subset of jointly managed dies in each of the multimode storage devices (e.g., 620, 630, 640, and 650) included in the storage system. Similarly, a metapage 1210 is an aggregation of corresponding SUE pages (e.g., 1211, 1212, 1213, 1214, and 1215) from each of corresponding SUE blocks 1411, 1412, 1413, 1414, and 1415 in a metablock 1410.

In an embodiment of the present invention, certain memory media management functions, such as erasures, programming, reclamation (garbage collection) and free space management, are performed at the metablock level. That is to say, these memory media management functions are coordinated at the storage system level, instead of at the individual storage device level.

In order to enable the desired system-level memory management, the logical address space dedicated to user data, which is addressed, for example, by applications and virtual machine (VM) operating systems, is mapped to a SUE address space. Thus, the user area of the multimode storage devices in the system is addressed through an underlying exposure interface. The system-level memory mapping and management results in a lower write amplification factor, which allows reduced storage provisioning, resulting in cost savings.

Figure 15:
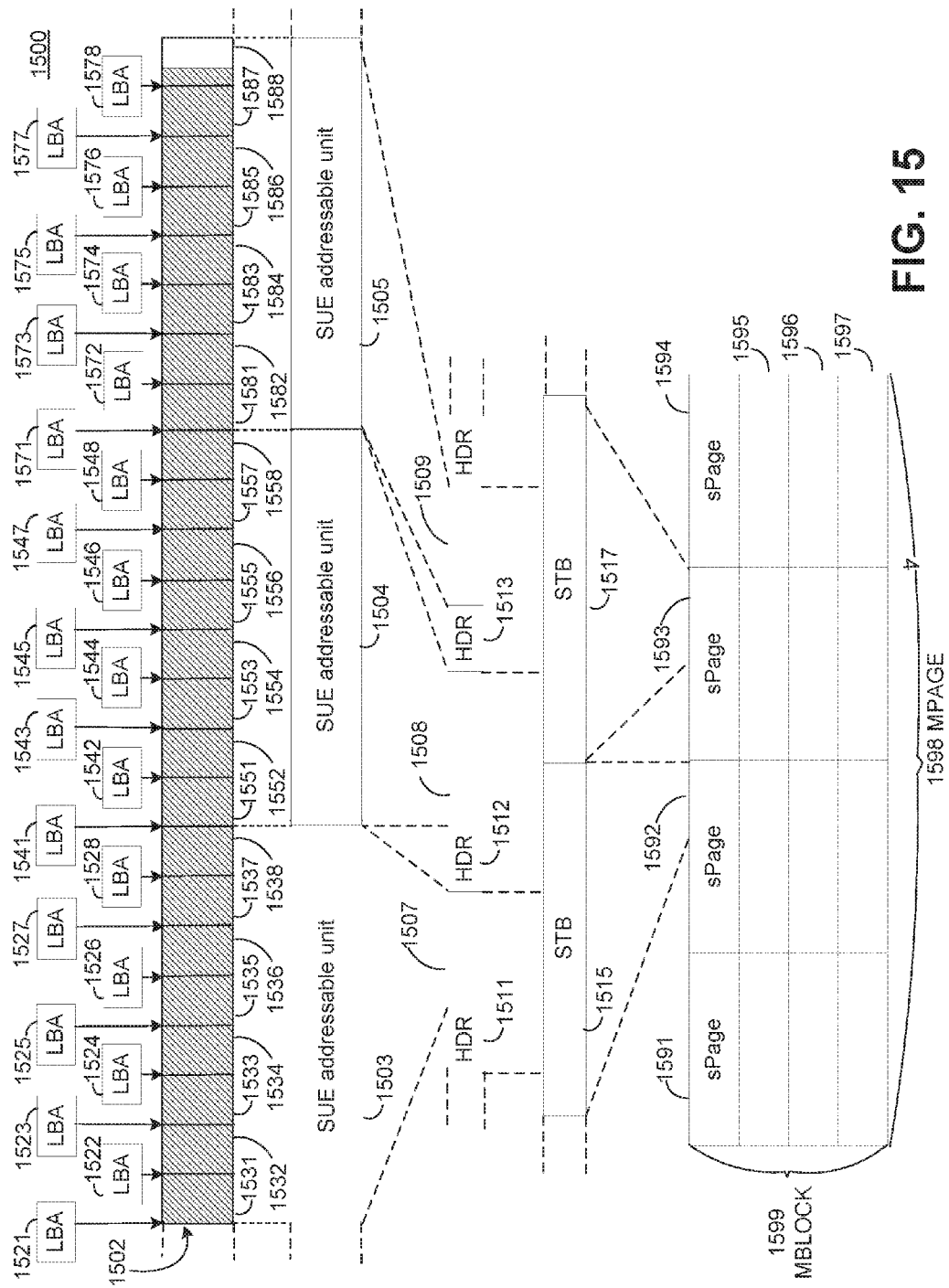
FIG. 15 is a block diagram depicting an exemplary SUE mapping scheme that may be implemented by a multimode storage system to provide logical-to-SUE storage address mapping in accordance with an embodiment of the present invention.

Referring to FIG. 15, a SUE mapping scheme 1500 is illustrated that may be implemented by a storage system, such as the multimode storage management system 610 of FIG. 6, to provide logical-to-SUE storage address mapping in an embodiment of the present invention. The SUE mapping scheme 1500 correlates a logical address space with a SUE address space. The SUE address space reveals significant features of the underlying physical storage media. The SUE address space is used to address the aggregate physical storage space of multiple storage devices in a storage system.

User data 1502 is received as input, for example, from host applications and virtual machine operating systems. The host user data is organized into storage units, for example, logically-addressed blocks, or logical blocks, that generally correspond to a logical block size, such as a 512K byte piece of information, associated with a native host file system, interface standard, or the like. Each logical block of received user data is addressed by a logical block address (LBA). For example, in some embodiments, the input logical block addressing corresponds to a Small Computer System Interface (SCSI) standard promulgated by the American National Standards Institute (ANSI).

The logically-addressed blocks of user data 1502 are combined into SUE addressable units, or hybrid mapping system (HMS) mapping blocks (HMBs). In some embodiments, an integral number of logical blocks 1504 are grouped to form a SUE addressable unit. For example, in FIG. 15, eight logical blocks are combined to form each SUE addressable unit. In alternative embodiments, any whole or fractional number of logical blocks may be combined to form a SUE addressable unit.

In an embodiment, the SUE addressable unit can be the minimum granularity of mapping for a system. In various embodiments, the SUE addressable unit size can include 4K bytes, 8K bytes, or any other suitable size or chunk of information.

In one embodiment, the storage system includes a set of volumes and each volume includes a set of SUE addressable units and each addressable unit includes a set of logical units. Different volumes can utilize different SUE addressable unit sizes. It is appreciated that a volume can have a number of characteristics. A volume can correspond to: an application, a single user level file system, a logical drive, a namespace (e.g., a collection of contiguous logical addresses associated with a given namespace), a LUN, and so on.

In the depicted example implementation: logically-addressed blocks 1531, 1532, 1533, 1534, 1535, 1536, 1537, and 1538 addressed by logical block addresses 1521, 1522, 1523, 1524, 1525, 1526, 1527, and 1528 are combined into SUE addressable unit 1503; logically-addressed blocks 1551, 1552, 1553, 1554, 1555, 1556, 1557, and 1558 addressed by logical block addresses 1541, 1542, 1543, 1544, 1555, 1546, 1547, and 1548 are combined into SUE addressable unit 1504; and logically-addressed blocks 1581, 1582, 1583, 1584, 1585, 1586, 1587, and 1588 addressed by logical block addresses 1571, 1572, 1573, 1574, 1575, 1576, 1577, and 1578 are combined into SUE addressable unit 1505. A logical block can span an addressable unit. There can be multiple blocks per addressable unit.

A data compression algorithm is optionally performed on the user data 1502 in the SUE addressable units (e.g., 1503, 1504, and 1505) to produce compressed SUE addressable units (e.g., 1507, 1508, and 1509). A header section (e.g., 1511, 1512, and 1513) is generated corresponding to each compressed SUE addressable unit (e.g., 1507, 1508, and 1509). The header section contains information, for example, for use in reclamation and data recovery activities.

The compressed SUE addressable units and header sections are placed in storage device transfer blocks, or SSD transfer blocks (STBs) 1515 and 1517. In the depicted example, header sections 1511, 1512, and 1513 and corresponding compressed SUE addressable units 1507, 1508, and 1509 are included in STBs 1515 and 1517. In an embodiment, compressed SUE addressable units, as well as enclosed logical blocks of user data, are allowed to span across two or more storage device transfer blocks.

An integral number of storage device transfer blocks are aligned to each SUE page 1591, 1592, 1593, and 1594 for transfer to a multimode storage device. In an embodiment, compressed SUE addressable units, as well as enclosed logical blocks of user data, are allowed to span across two or more SUE pages 1591, 1592, 1593, and 1594.

In an embodiment, error checking, such as error-correcting code (ECC), is not implemented with respect to the user data 1502 at the system level, but rather, error checking must be implemented by the individual multimode storage devices.

Metadata associated with the user data is stored in a logically-addressed system area of the multimode storage device (e.g., 350, 400, or 620). For example, in an embodiment, a partition of memory cells in the multimode storage device addressed using logical block addressing stores a map table that maps the SUE addressable units into the SUE address space. That is, the map table stores pointers, each of which points to an individual SUE addressable unit. Thus, the corresponding storage locations of the logical blocks of user data in the SUE address space can be determined using the mapping of the SUE addressable units and corresponding offsets of the logical blocks and SUE addressable units.

In one embodiment, information is stored in a volume (e.g., 671, 672, and 673). There can be multiple volumes or name spaces and different volumes or namespaces can be associated with different size SUE addressable units. It is also appreciated that different size volumes or namespaces can be associated with the same size SUE addressable units.

Figure 16:
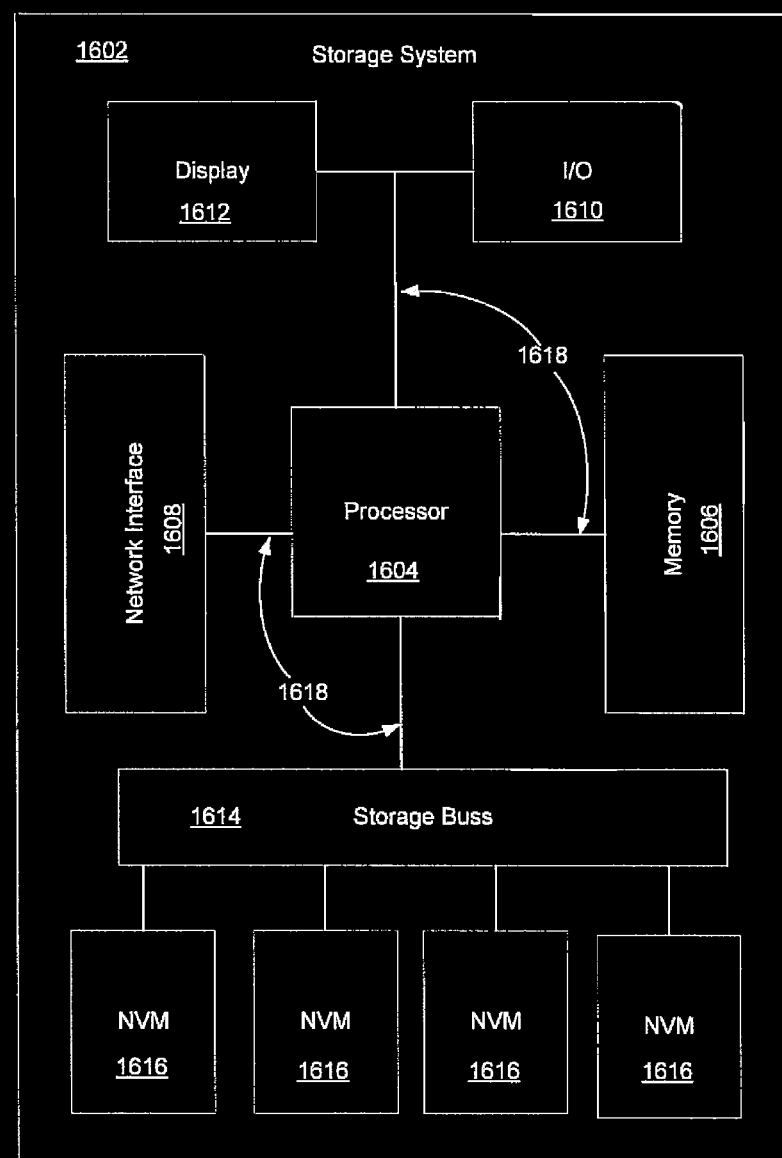
FIG. 16 is a schematic view depicting an exemplary storage system that can implement the SUE mapping scheme of FIG. 15.

As illustrated in FIG. 16, an exemplary storage system 1602 that can implement the SUE mapping scheme 1500 of FIG. 15 includes a processor 1604, a memory 1606, a network interface 1608, an input/output (I/O) device 1610, a display device 1612, a storage bus 1614 and multiple nonvolatile memory devices 1616. The various components of the storage device 1602 are coupled by local data links 1618, which in various embodiments incorporate, for example, an address bus, a data bus, a serial bus, a parallel bus, or any combination of these.

The processor 1604 may include any general or application-specific digital processor suitable for controlling a storage system. The memory 1606 may include any digital memory device suitable for storing data and instructions for access by the processor 1604. The network interface 1608 may include any networking interface suitable for communicatively connecting the storage system 1602 to a communications network, such as a local area network (LAN) or an internet protocol (IP) network. The network interface 1608 may implement a storage networking standard, for example, the Internet Small Computer System Interface (iSCSI) protocol.

The input/output device 1610 may include any suitable device for sending or receiving digital information to or from the storage system 1602. The display device 1612 may include any suitable device for displaying text or a graphical user interface (GUI). The storage bus 1614 may include, for example, a peripheral component interconnect express (PCIe) bus, or any other suitable high-speed serial expansion bus for communications in a storage system known in the art. The storage bus 1614 may utilize standard NVM Express (NVMe), or Non-Volatile Memory Host Controller Interface Specification (NVMHCI), commands to access storage devices in the storage system, such as the nonvolatile memory devices 1616. The nonvolatile memory devices 1616 may include, for example, NAND flash-based solid state drives (SSDs), or any other suitable nonvolatile memory device known in the art.

In an alternative embodiment, a general computing device implements the functions of the SUE mapping scheme 1500 of FIG. 15. For example, the general computing device may include a server, a work station, a personal computer, or the like.

Programming code, such as source code, object code or executable code, stored on a computer-readable medium, such as the nonvolatile memory devices 1616, can be loaded into the memory 1606 and executed by the processor 1604 in order to perform the functions of the SUE mapping scheme 1500 of FIG. 15. In alternative embodiments, executable instructions may be stored in firmware, or the functions may be performed by specialized hardware.

Figure 17:
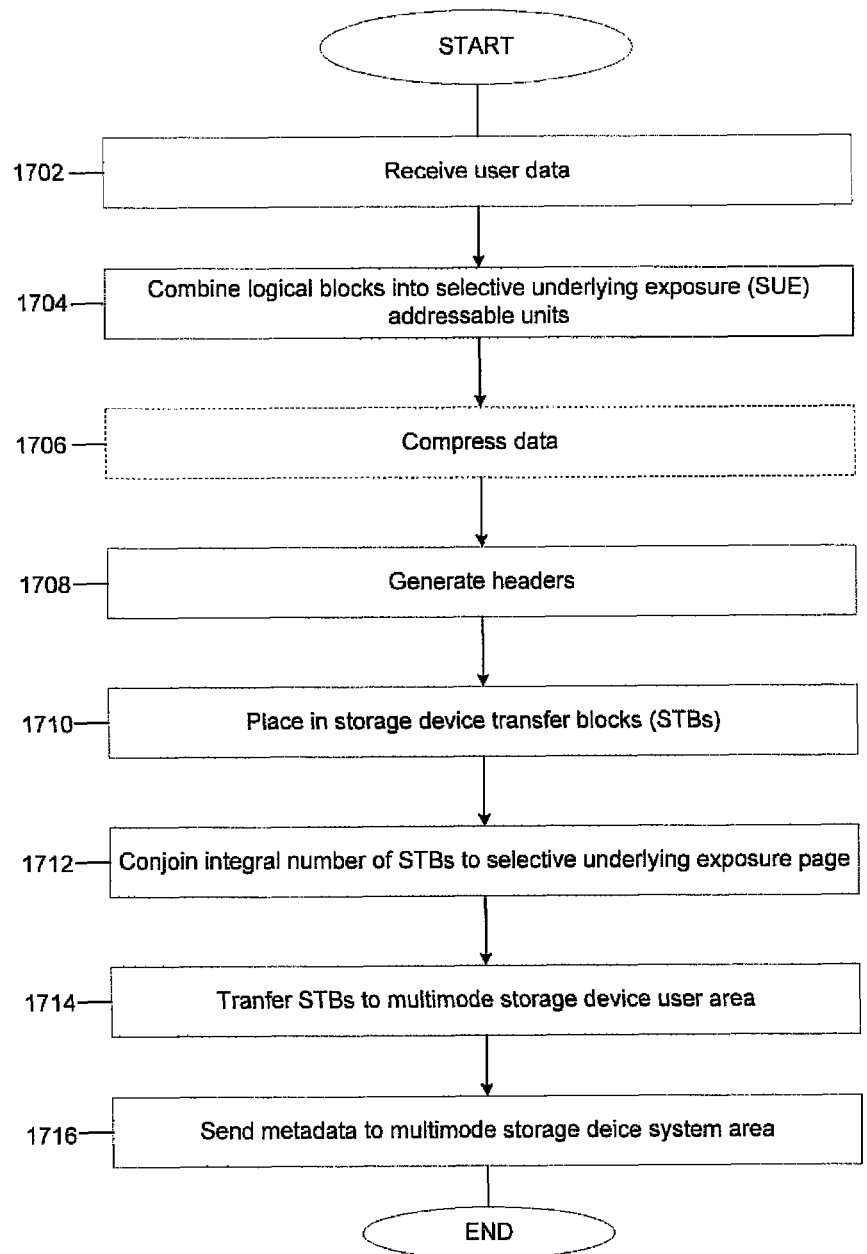
FIG. 17 is a flowchart representing an exemplary method of mapping a logical address space to a SUE address space in accordance with an embodiment of the present invention.

Referring now to FIG. 17, an exemplary process flow is illustrated that may be performed, for example, by the storage system 1602 of FIG. 16 to implement an embodiment of the SUE mapping scheme described in this disclosure for mapping a logical address space to a SUE address space in order to address the aggregate physical storage space of multiple storage devices in a storage system.

The process begins at block 1702, where user data is received, for example, from a host application or a virtual machine operating system. The received user data is organized in logical blocks and addressed by logical block addresses. The logical blocks correspond to a minimum addressable memory unit size associated with a native host file system, database, or the like.

In block 1704, as described above, the logical blocks are combined into SUE addressable units. For example, an integral number of logical blocks are grouped to form each SUE addressable unit. A data compression algorithm is optionally performed, in block 1706, on the user data in the SUE addressable units, as explained above. (Components shown with dashed lines in FIG. 17 are optional items.)

A header section is generated and added to each SUE addressable unit, in block 1708, including, for example, information for use in reclamation and data recovery activities, as described above. In block 1710, the compressed SUE addressable units and header sections are placed in storage device transfer blocks, as explained above.

As further explained above, in block 1712, an integral number of storage device transfer blocks are conjoined and aligned to a SUE page, and in block 1714 the storage transfer blocks corresponding to the SUE page are transferred to a multimode storage device to be stored in the user area. In block 1716, metadata regarding the user data in the SUE page is sent to the multimode storage device to be stored in the system area, as described above.

Multimode Storage Management System

Figure 18:
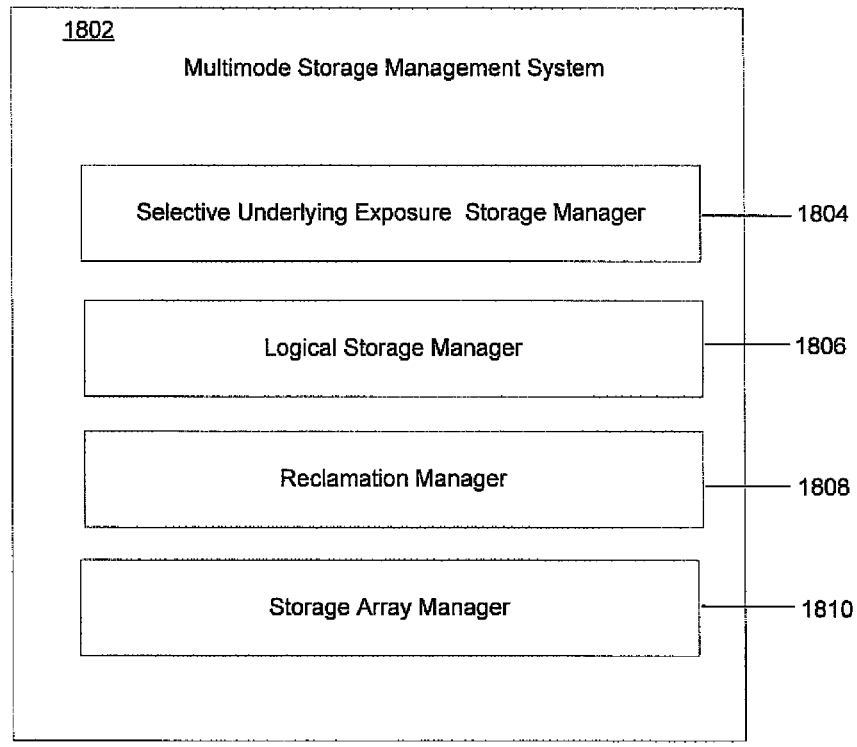
FIG. 18 is a schematic view illustrating an exemplary multimode storage management system that employs a SUE addressing scheme in order to allow a storage system to address logical and SUE storage spaces in a storage device in accordance with an embodiment of the present invention.

Another embodiment of the present invention is shown in FIG. 18, which illustrates an exemplary multimode storage management system 1802 that employs a SUE addressing scheme in order to allow a storage system to address logical and SUE storage spaces in a storage system, such as the storage system 1602 of FIG. 16. The multimode storage management system 1802 includes a SUE storage manager 1804, a logical storage manager 1806, a reclamation manager 1808 and a storage array manager 1810.

The SUE storage manager 1804 provides user data storage mapping, read and write functions. The SUE storage manager 1804 maps user data to a user area of a storage system using a SUE address mapping scheme. The SUE storage manager 1804 accesses user data stored in the user area through a SUE interface to the storage devices of the storage system.

The SUE mapping scheme distributes the logical block address-to-physical address mapping function between the storage system and the storage devices. That is to say, the SUE mapping scheme combines storage system-level mapping, or virtualization, from logical block addresses to SUE addresses with storage device-level mapping, or translation, from SUE addresses to physical addresses.

The SUE mapping scheme exposes certain physical features, or representative geometry, of the storage devices to the storage system, enabling certain nonvolatile memory management functions with regard to user data to be performed at the storage system level across multiple storage devices, rather than at the individual storage device level. This redistribution of user data management tasks from the individual storage device level to the storage system level can result in system efficiencies, including a reduced write amplification factor, permitting reduced resource provisioning and lowering costs.

The logical storage manager 1806 provides system data storage mapping, read and write functions. The logical storage manager 1806 maps system data to a system area of the storage device using a logical address mapping scheme, such as conventional logical block addressing (LBA) known in the art. The logical storage manager 1806 accesses system data stored in the system area through a logical interface to the storage device.

Thus, in an embodiment, the memory space of an associated storage device or each of multiple associated storage devices is subdivided, or partitioned, into separate storage areas, or address spaces, including a logically-addressed system area and a SUE address user area. The storage devices include two host interfaces, a logical host interface that provides access to the logically-addressed system area and a SUE host interface that provides access to the SUE address user area. Nonvolatile memory management functions with regard to system data are performed by the individual storage device controllers.

The reclamation manager 1808 provides nonvolatile memory management, including free space management and reclamation, or garbage collection, functions at the storage system level with regard to user data. Thus, the individual storage devices in the storage system do not perform local reclamation (garbage collection) for user data. The reclamation manager 1808 may implement conventional free space management and reclamation methods known in the art. In some embodiments, the reclamation manager 1808 also performs novel free space management and reclamation methods described in this disclosure.

The storage array manager 1810, or redundant array of independent disks (RAID) manager, provides storage management for an array of multiple storage devices in the storage system, including data recovery functions, with regard to user data. Thus, the individual storage devices in the storage system do not perform die-level RAID functions for user data. The storage array manager 1810 may implement conventional storage management and data recovery methods known in the art. In some embodiments, the storage array manager 1810 also performs novel storage management and data recovery methods described in this disclosure.

Figure 19:
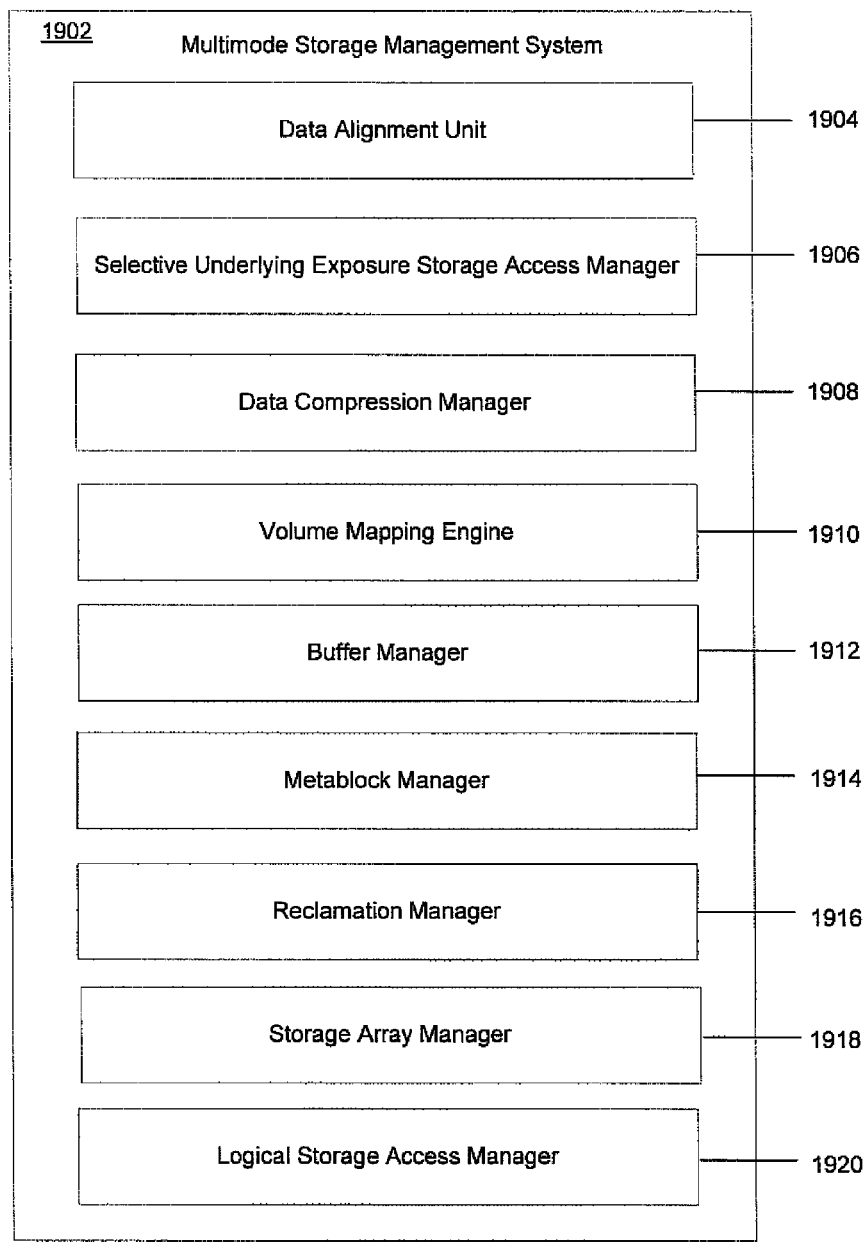
FIG. 19 is a schematic view illustrating another exemplary multimode storage management system that employs a SUE addressing scheme in order to allow a storage system to address logical and SUE storage spaces in a storage device in accordance with an embodiment of the present invention.

Referring now to FIG. 19, another exemplary multimode storage management system 1902 is illustrated that employs a SUE addressing scheme in order to allow a storage system to address logical and SUE storage spaces in a storage system, such as the storage system 1602 of FIG. 16. The multimode storage management system 1902 includes a data alignment unit (DAU) 1904, a SUE storage access manager 1906, a data compression manager 1908, a volume mapping engine 1910, a buffer manager 1912, a metablock manager 1914, a reclamation manager 1916, a storage array manager 1918 and a logical storage access manager 2020.

The data alignment unit (DAU) 1904 receives logically-addressed media access commands, for example, read, write and unmap commands from a Small Computer System Interface (SCSI) target. By convention, the commands utilize logical block addressing (LBA), an SCSI memory location abstraction standard based on a linear addressing scheme in which memory blocks are indicated by an integer index. In logical block addressing, a single-integer base address is used to identify the beginning of each logical block of data, and each linear base address is uniquely associated with a single logical block. Thus, logical block addressing hides, or masks, the specific details or features of the storage device from the operating system, file system, device drivers and host applications.

During write operations, the data alignment unit 1904 combines logical blocks of data received from the SCSI target into SUE mapping blocks. For example, in some embodiments, an integral number of logical blocks are grouped to form a SUE mapping block. The data compression manager 1908 optionally performs a data compression algorithm on the user data in the SUE mapping blocks.

During read operations, the data alignment unit 1904 receives a read command from the SCSI target and passes on a read request to the SUE storage access manager 1906. The data alignment unit 1904 receives the requested user data from the SUE storage access manager 1906 and passes the requested user data to the SCSI target.

The SUE storage access manager 1906 provides user data storage read and write functions. During write operations, the SUE storage access manager 1906 generates a header section for each SUE mapping block. The header section contains information, for example, for use in reclamation and data recovery activities. The SUE storage access manager 1906 places the compressed SUE mapping blocks, together with the corresponding header sections, in storage device transfer blocks. In an embodiment, compressed SUE mapping blocks, as well as enclosed logical blocks of user data, are allowed to span across two or more storage device transfer blocks.

The SUE storage access manager 1906 further aligns an integral number of storage device transfer blocks to a SUE page for transfer to a storage device. The SUE storage access manager 1906 transfers the storage device transfer blocks corresponding to the SUE page to a write buffer.

In an embodiment, compressed SUE mapping blocks, as well as enclosed logical blocks of user data, are allowed to span across two or more SUE pages. Each SUE page corresponds to an individual storage device of the storage system. The SUE page is the basic unit of storage programming, or write operations, in the SUE mapping scheme.

During read operations, the SUE storage access manager 1906 determines the location of the requested user data and requests that the requested user data be read from the associated storage device(s) to a read buffer. The SUE storage access manager 1906 transfers the user data from the read buffer to the data alignment unit 1904.

The data compression manager 1908 performs a compression algorithm on the user data as a subfunction of—or as a complementary function to—the SUE addressing scheme. The data compression function performed by the data compression manager 1908 can help offset inherent system factors that result in write amplification.

The volume mapping engine 1910 coordinates the SUE address mapping functions. The volume mapping engine 1910 maintains a user area map table that records the current location of user data. The user area map table includes mapping information that correlates logical block addresses to SUE addresses of stored user data. The user area map table is stored in the logically-addressed system area of the associated storage device(s).

During write operations, the volume mapping engine 1910 updates the user area map table with new or revised SUE address location(s) received from the SUE storage access manager 1906 with respect to the written user data.

During read operations, the volume mapping engine 1910 looks up the SUE address location(s) of the requested user data in the user area map table based on the requested logical block address(es) and provides the SUE address location(s) to the SUE storage access manager 1906.

The volume mapping engine 1910 organizes the user data into SUE pages, SUE blocks, metapages and metablocks. A SUE block maps to a number of physical blocks on an individual storage device. In an embodiment, each physical block that is mapped to the same SUE block is located on a separate die of the storage device. All of the physical blocks that are mapped to the same SUE block are erased and managed as a unit at the storage device level. Thus, a SUE block corresponds to a group of physical blocks that are jointly managed on respective dies with respect to reclamation and free space management. Equivalently, a group of respective physical blocks on dies corresponding to a SUE block are managed as a unit of storage media.

Each SUE block includes a number of SUE pages, each of which aligns to a physical page of a respective physical block that is mapped to the SUE block. Corresponding SUE pages of respective SUE blocks across all of the storage devices included in a storage system are mapped to a metapage. Similarly, corresponding SUE blocks across all of the storage devices included in a storage system are mapped to a metablock.

Storage media management functions at the multimode storage management system level, such as reclamation and free space management, are performed with respect to metablocks of user data. Thus, storage media management functions at the multimode storage management system level are performed with respect to groups of corresponding physical blocks that are jointly managed in each storage device included in a storage system.

Programming operations and read operations are performed with respect to metapages of user data. Thus, programming operations and read operations are performed with respect to groups of corresponding physical pages that are jointly managed in each nonvolatile memory device included in a storage system.

Thus, the storage devices in a storage system are virtualized in a manner that exposes significant organization, or representative geometry, of the physical storage to the multimode storage management system 1902. Groups of physical blocks that are jointly managed on respective dies in a single storage device are presented to the multimode storage management system 1902 as SUE blocks, and corresponding groups of physical blocks that are jointly managed on respective dies across all of the storage devices in the storage system are presented to the multimode storage management system 1902 as metablocks.

Similarly, groups of physical pages that are jointly programmed on respective dies in a single storage device are presented to the multimode storage management system 1902 as SUE pages, and groups of physical pages that are jointly programmed on respective dies across all of the storage devices in the storage system are presented to the multimode storage management system 1902 as metapages.

The buffer manager 1912 manages a pool of read and write buffers. During write operations, the buffer manager 1912 accumulates storage device transfer blocks received from the SUE storage access manager 1906 in write buffers until approximately a complete metapage of user data has accumulated before the user data is separately sent by way of the storage array manager 1918 to the individual storage devices as SUE pages.

During read operations, the buffer manager 1912 provides read buffers to support the read cache function. SUE pages of user data received in storage device transfer blocks from the storage array manager 1918 are saved in read buffers until being forwarded to the SUE storage access manager 1906.

The metablock manager 1914 keeps track of the current state of individual metablocks defined in the user area of the storage devices, for example, erased, active, closed, reclamation or erasing. The current states are stored in a metablock information table that is stored in memory and backed up in the system area of the storage devices. The metablock manager 1914 also keeps corresponding lists of metablocks currently in particular states, such as an erased list, a reclamation list and an erasing list. The metablock manager 1914 selects specific metablocks for submission to the SUE storage access manager 1906 for reclamation activities.

The reclamation manager 1916 services reclamation requests from the metablock manager 1914 to recover valid user data from designated metablocks and relocate the valid user data to other metablocks. The reclamation manager 1916 requests that the physical memory cells corresponding to the designated metablocks be erased and reclaimed to provide free space in the user area of the storage devices.

The storage array manager 1918 provides a SUE interface with the user area of the storage devices, as well as a logical interface with the system area of the storage devices. The storage array manager 1918 provides data protection functions, such as RAID striping and parity checks. For example, in an embodiment, storage device transfer blocks are used as RAID elements, and a RAID stripe includes storage device transfer blocks across all SUE pages in a metapage. Thus, should a single storage device in the storage system fail, the storage array manager 1918 is able to recover the data from the failed storage device using a reverse parity computation.

The logical storage access manager 1920 provides system data storage read and write functions using logical addressing methods known in the art. The logical storage access manager 1920 stores and retrieves metadata regarding the user data, including the user area map table, metablock information table, volume table, as well as storage system files, log files, and the like.

With regard to user data stored in the user area, the individual nonvolatile memory devices are responsible for certain memory media management functions, including read retry, failed-physical-block mapping, error-correcting code (ECC) and advanced incremental step pulse programming (ISPP). With regard to system data stored in the system area, the individual nonvolatile memory devices are responsible for all memory media management functions, including reclamation, wear-leveling, read and write caching, read retry, failed-physical-block mapping, error-correcting code (ECC) and advanced incremental step pulse programming (ISPP).

Figure 20:
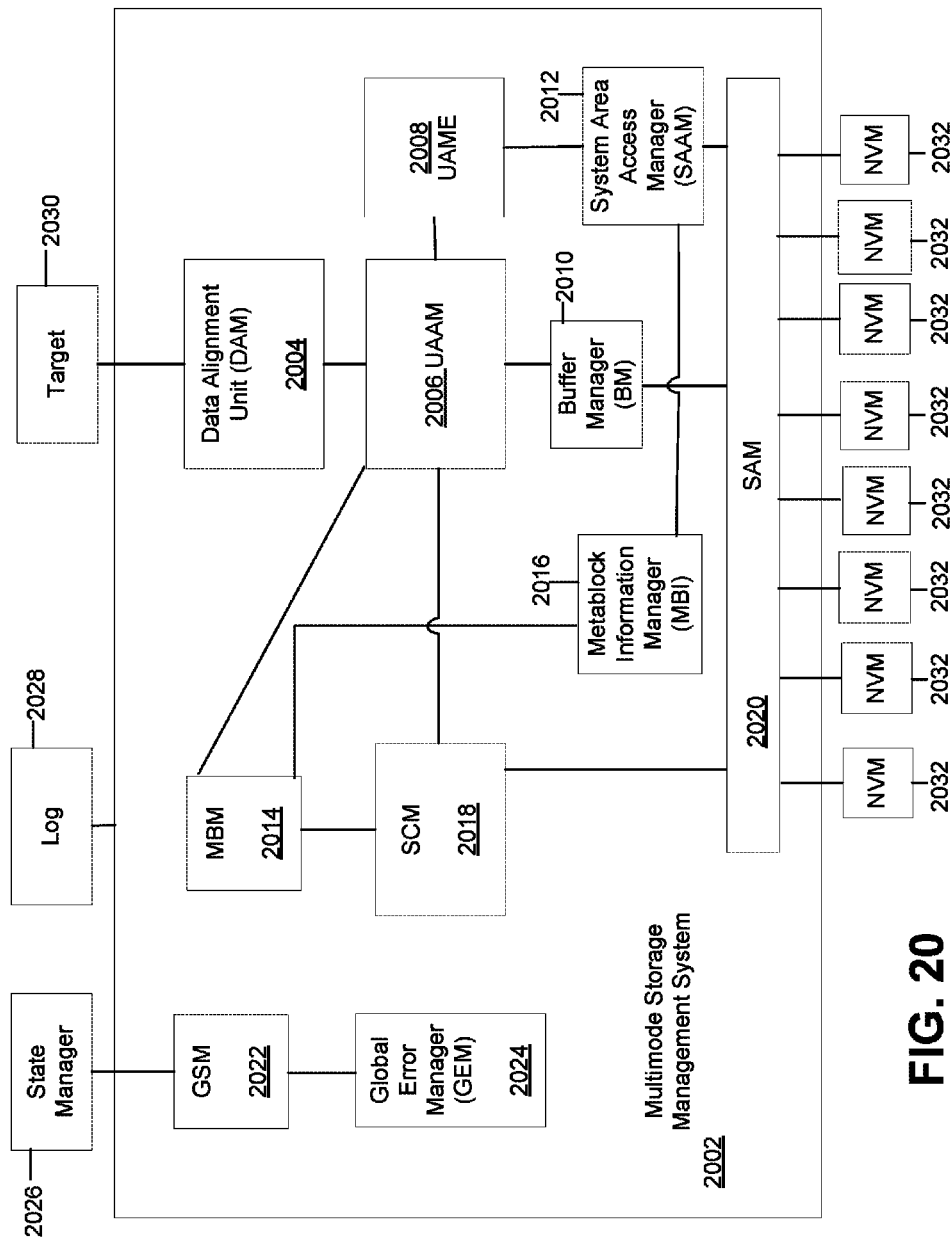
FIG. 20 is a schematic view illustrating yet another exemplary multimode storage management system that employs a SUE addressing scheme in order to allow a storage system to address logical and SUE storage spaces in a storage device in accordance with an embodiment of the present invention.

Referring now to FIG. 20, another exemplary multimode storage management system 2002, or hybrid mapping system (HMS), is illustrated that employs a SUE addressing scheme in order to allow a storage system to address logical and SUE storage spaces in a storage device. The multimode storage management system 2002 acts as a global flash translation layer (GFTL) responsible for nonvolatile memory media management with regard to a user area distributed across multiple storage devices in a storage system. The multimode storage management system 2002 performs nonvolatile memory media access functions, address mapping functions to map host application logical address space elements into SUE address space data structures that are aligned to physical nonvolatile memory locations, reclamation and wear-leveling functions.

The multimode storage management system 2002 includes a data alignment unit (DAU) 2004, a user area access manager (UAAM) 2006, a user area mapping engine (UAME) 2008, a buffer manager (BM) 2010, a system area access manager (SAAM) 2012, a metablock manager (MBM) 2014, a metablock information manager (MBI) 2016, a storage device control manager (SCM) 2018, a storage device access manager (SAM) 2020, a global state manager (GSM) 2022 and a global error manager (GEM) 2024.

The multimode storage management system 2002 is communicatively connected to a system state manager 2026, a system logging and statistics manager 2028, a target device 2030 and multiple nonvolatile memory (NVM) devices 2032.

The data alignment unit (DAU) 2004 receives logically-addressed media access commands, for example, read, write and unmap commands from target module 2030. The data alignment unit 2004 receives a logical block addressing (LBA) buffer list as input. During write operations, the data alignment unit 2004 combines logical blocks of data received from the target into SUE mapping blocks, or hybrid mapping blocks (HMBs). For example, in some embodiments, an integral number of logical blocks are grouped to form a SUE mapping block.

The data alignment unit 2004 consolidates both aligned and unaligned user data traffic arriving from the target module 2030, performing read/modify/write operations for non-aligned write traffic in order to align the data to the logical-to-physical mapping units (SUE mapping blocks). The data alignment unit 2004 places the user data into a SUE mapping block-aligned buffer list. In various embodiments, SUE mapping blocks may contain a fixed quantity of data, such as 4 KB, 8 KB, 16 KB, or the like.

During read operations, the data alignment unit 2004 receives a read command from the target module 2030 and passes on a read request to the user area access manager 2006. The data alignment unit 2004 receives the requested user data from the user area access manager 2006 and passes the requested user data to the target module 2030.

Figure 21:
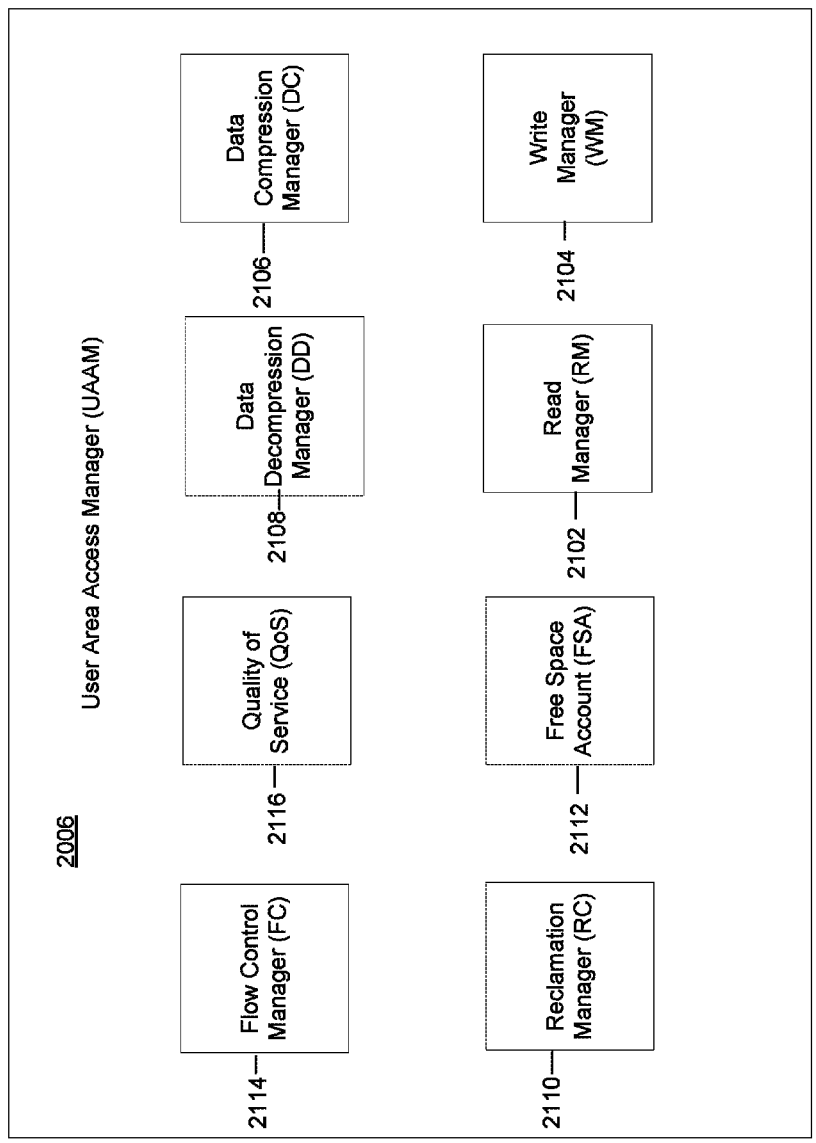
FIG. 21 is a schematic view illustrating a user area access manager (UAAM) that can be implemented by a multimode storage management system in accordance with an embodiment of the present invention.

Referring to FIG. 21, the user area access manager (UAAM) 2006 includes a read manager (RM) 2102, a write manager (WM) 2104, a data compression manager (DC) 2106, a data decompression manager (DD) 2108, a reclamation manager (RC) 2110, a free space account (FSA) 2112, a flow control manager (FC) 2114 and a quality of service manager (QoS) 2116.

The read manager (RM) 2102 receives read requests from the data alignment unit 2004 and services the read requests. The read manager 2102 requests relevant mapping information from the user area mapping engine (UAME) 2008. The read manager 2102 posts the read requests to the storage device access manager 2020. During read operations, the read manager 2102 requests the release of user data in the read buffers from the buffer manager 2010. The read manager 2102 posts decompression requests regarding read user data to the data decompression manager 2108.

The write manager (WM) 2104 receives write requests from the data alignment unit 2004. During write operations, the write manager 2104 generates metadata headers on the SUE mapping block stream, and generates mapping information for the user area mapping engine 2008 regarding the SUE addressing of user data. The write manager 2104 posts compression requests to the data compression data compression manager 2106 to schedule user data compression commands, and posts write requests to the storage device access manager 2020. The write manager 2104 requests the release of user data in the write buffers from the buffer manager 2010. When the current metablock of write data has become full, the write manager 2104 requests the metablock manager (MBM) 2014 to open a new active metablock.

The data compression manager (DC) 2106 receives data compression requests from the write manager 2104 and services the compression requests. In some embodiments, the data compression manager 2106 implements a data compression algorithm on the user data in the SUE mapping blocks. In other embodiments, the data compression manager 2106 schedules data compression tasks to an external compressing unit (not shown).

The data decompression manager (DD) 2108 receives data decompression requests from the read manager 2102 and services the decompression requests. In some embodiments, the data decompression manager 2108 implements a data decompression algorithm on the user data in the SUE mapping blocks. In other embodiments, the data decompression manager 2108 schedules data decompression tasks to an external decompressing unit (not shown).

The reclamation manager (RC) 2110 receives reclamation requests from the metablock manager 2014 and services the requests to recover valid data from designated metablocks to reclaim free space. The reclamation manager 2110 requests relevant mapping information from the user area mapping engine 2008 and posts read requests to the read manager 2102 regarding the designated metablocks. The reclamation manager 2110 parses metadata headers accompanying the SUE mapping blocks in the storage device read data stream and posts write requests to the write manager 2104 regarding all valid data remaining in the designated metablocks. The reclamation manager 2110 also services requests from the storage device control manager (SCM) 2018 to reclaim partial metablock data.

The free space account (FSA) 2112 receives mapping information from the write manager 2104 during write operations and generates free space information regarding stale user data in stored metablocks. The free space account 2112 posts free space information to the metablock information manager 2016 to update corresponding metablock information table entries.

The flow control manager (FC) 2114 monitors system resources, such as read/write buffers, compression buffers, storage bus and other queue depths, or the like. If system-level resource provisioning falls below preset limits, the flow control manager 2114 resets throttling-down levels in the quality of service manager 2116. In an embodiment, required provisioning levels can be established using system administrator commands. The flow control manager 2114 provides statistics for the system administrator, which can be used for interface level throttling.

The quality of service manager (QoS) 2116 defines quality of service policies based on system resource provisioning levels and latency measurements. The quality of service manager 2116 implements multiple queues to service different quality of service policy pools. With regard to latency-based policies, the quality of service manager 2116 implements timestamps on queue entries. The quality of service manager 2116 monitors various queue parameters and selects requests to ensure the policies are not violated. At the request of the flow control manager 2114, the quality of service manager 2116 throttles down traffic on provisioning-based policy queues.

Figure 22:
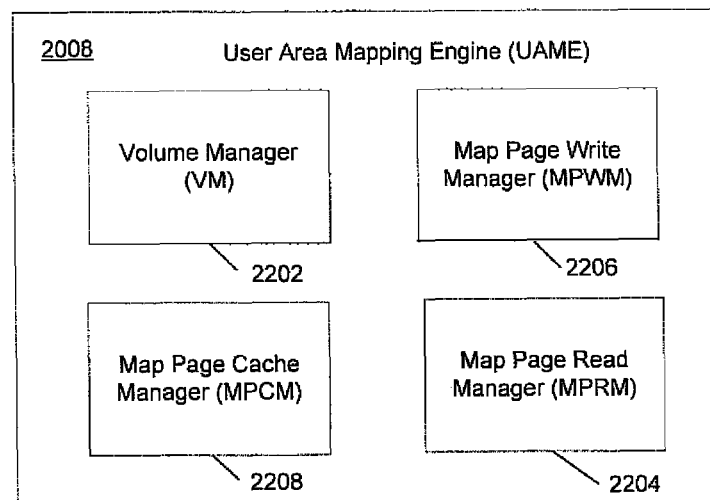
FIG. 22 is a schematic view illustrating a user area mapping engine (UAME) that can be implemented by a multimode storage management system in accordance with an embodiment of the present invention.

Referring to FIG. 22, the user area mapping engine (UAME) 2008 includes a volume manager (VM) 2202, a map page read manager (MPRM) 2204, a map page write manager (MPWM) 2206, and a map page cache manager (MPCM) 2208.

The volume manager (VM) 2202 provides services to create, destroy and manage volumes and handles multiple provisioning policies. The volume manager 2202 maintains relevant information in a volume table that is stored in memory and backed up in the system area, and provides access services to entries in the volume table. The volume manager 2202 uses the system area access manager 2012 to back up and restore the volume table.

The map page read manager (MPRM) 2204 receives and services requests from the map page cache manager 2208 for absent mapping pages when map page misses are detected by the map page cache manager 2208.

The map page write manager (MPWM) 2206 receives and services requests from the map page cache manager 2208 for mapping page evictions.

The map page cache manager (MPCM) 2208 services mapping entry information requests from the read manager 2102 and reclamation manager 2110, as well as mapping entry updates provided by the write manager 2104. When a map page miss is detected, the map page cache manager 2208 requests the absent mapping page from the map page read manager 2204. The map page cache manager 2208 requests mapping page evictions from the map page write manager 2206.

The buffer manager (BM) 2010 manages a pool of read and write buffers. During write operations, the buffer manager 2010 allocates and releases storage device transfer blocks to accumulate user data received from the write manager 2104 in write buffers. The buffer manager 2010 receives requests for the release of user data in the write buffers from the write manager 2104 when approximately a complete metapage of user data has accumulated, and forwards the user data to the storage device access manager 2020.

During read operations, the buffer manager 2010 allocates and releases storage device transfer blocks in read buffers to support the read cache function. SUE pages of user data received in storage device transfer blocks from the storage device access manager 2020 are initially saved in the read buffers. The buffer manager 2010 receives a request from the read manager 2102 for the release of user data in the read buffers, and the buffer manager 2010 forwards the storage device transfer blocks to the read manager 2102.

The system area access manager (SAAM) 2012 services requests regarding access to system data stored in the system area of the storage devices in the storage system. The system area access manager 2012 receives and services requests from the volume manager 2202 and the metablock information manager 2016 to back up and restore the volume table and the metablock information table, respectively. The system area access manager 2012 receives and services requests from the map page write manager 2206, the map page read manager 2204 and the map page cache manager 2008 to access the user area map table.

Figure 23:
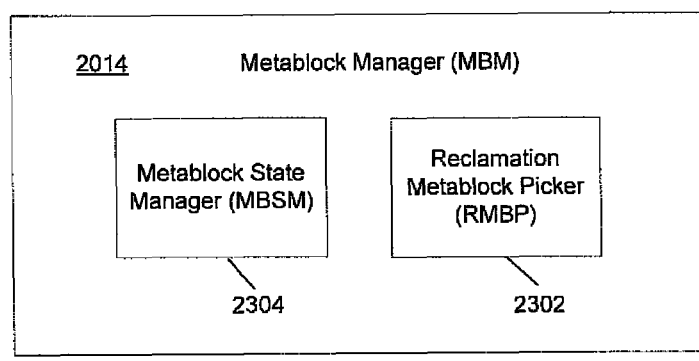
FIG. 23 is a schematic view illustrating a metablock manager (MBM) that can be implemented by a multimode storage management system in accordance with an embodiment of the present invention.

Referring to FIG. 23, the metablock manager 2014 includes a reclamation metablock picker (RCMBP) 2302 and a metablock state manager (MBSM) 2304. The reclamation metablock picker (RCMBP) 2302 monitors parameters regarding the user area metablocks, such as erase count, stale data level, dwell time, and the like. Based on the monitored parameters, the reclamation metablock picker 2302 selects metablocks for reclamation, or garbage collection. The reclamation metablock picker 2302 implements wear-leveling policies known in the art. For example, the reclamation metablock picker 2302 attempts to maintain metablock erase counts within a preferred value range, and attempts to segregate relatively dynamic (hot) and relatively static (cold) data in separate metablocks.

The metablock state manager (MBSM) 2304 tracks the current state of the user area metablocks, for example, active, closed, erasing, erased, reclamation or garbage collection. The metablock state manager 2304 transitions metablocks through the various states by updating the metablock information table. The metablock state manager 2304 also maintains various lists of metablocks in specific states, for example, an erased metablock list, a reclamation metablock list and an erasing metablock list. The metablock state manager 2304 monitors the erased metablock list to determine individual metablocks that are ready for reclamation (garbage collection).

The metablock information manager (MBI) 2016 maintains the metablock information table. The metablock information manager 2016 maintains the metablock information table and provides access services to entries in the metablock information table for other modules. The metablock information manager 2016 sends requests to the system area access manager 2012 to back up and restore the metablock information table.

Figure 24:
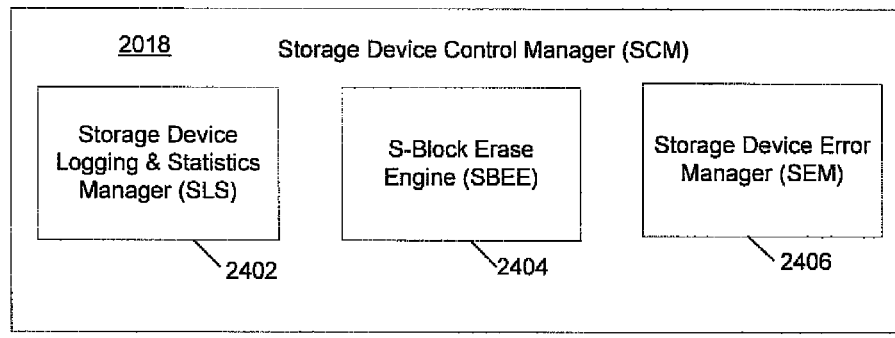
FIG. 24 is a schematic view illustrating a storage device control manager (SCM) that can be implemented by a multimode storage management system in accordance with an embodiment of the present invention.

Referring to FIG. 24, the storage device control manager (SCM) 2018, or solid state device (SSD) control manager (SCM), includes a storage device logging and statistics manager (SLS) 2402, a S-Block erase engine (SBEE) 2404 and a storage device error manager (SEM) 2406.

The storage device logging and statistics manager (SLS) 2402 maintains a log of storage device access history.

The S-Block erase engine (SBEE) 2404 receives erasure requests from the reclamation manager 2110 by way of the metablock manager 2014 and manages the erasure process. The S-Block erase engine 2404 sends S-Block erasure requests to the storage device access manager 2020.

The storage device error manager (SEM) 2406 sends requests to the reclamation manager 2110 to reclaim partial metablock data.

Figure 25:
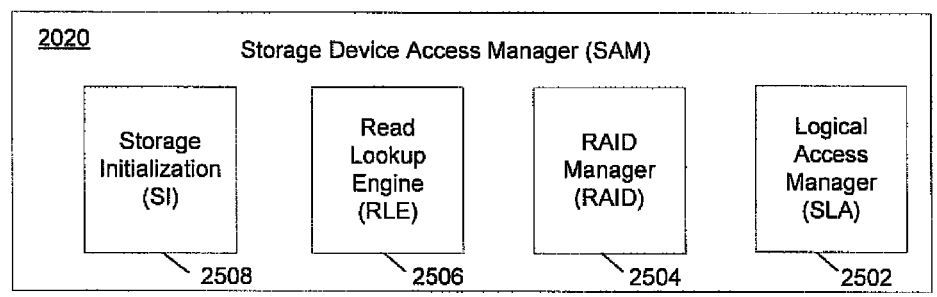
FIG. 25 is a schematic view illustrating a storage device access manager (SAM) that can be implemented by a multimode storage management system in accordance with an embodiment of the present invention.

Referring to FIG. 25, the storage device access manager (SAM) 2020 includes a logical access manager (SLA) 2502, a RAID manager (RAID) 2504, a read lookup engine (RLE) 2506 and a storage initialization manager (SI) 2508.

The logical access manager (SLA) 2502, or SSD logical access manager, provides access services with respect to system data in the system area of the storage devices. The logical access manager 2502 uses conventional logical block addressing as known in the art to address system data in the system area of the storage devices. The logical access manager 2502 utilizes standard NVM Express (NVMe), or Non-Volatile Memory Host Controller Interface Specification (NVMHCI), commands to access storage devices, or solid-state drives (SSDs), in the storage system.

The RAID manager (RAID) 2504 provides storage management for an array of multiple storage devices in the storage system, including data recovery functions, with regard to user data. Thus, the individual storage devices in the storage system do not perform die-level RAID functions for user data. The RAID manager 2504 may implement conventional storage management and data recovery methods known in the art. In some embodiments, the RAID manager 2504 also performs novel storage management and data recovery methods described in this disclosure.

The RAID manager 2504 provides a SUE interface with the user area of the storage devices, as well as a logical interface with the system area of the storage devices. The RAID manager 2504 provides data protection functions, such as RAID striping and parity checks. For example, in an embodiment, storage device transfer blocks are used as RAID elements, and a RAID stripe includes storage device transfer blocks across all SUE pages in a metapage. Thus, should a single storage device in the storage system should fail, the RAID manager 2504 is able to recover the data from the failed storage device using a reverse parity computation.

Figure 26:
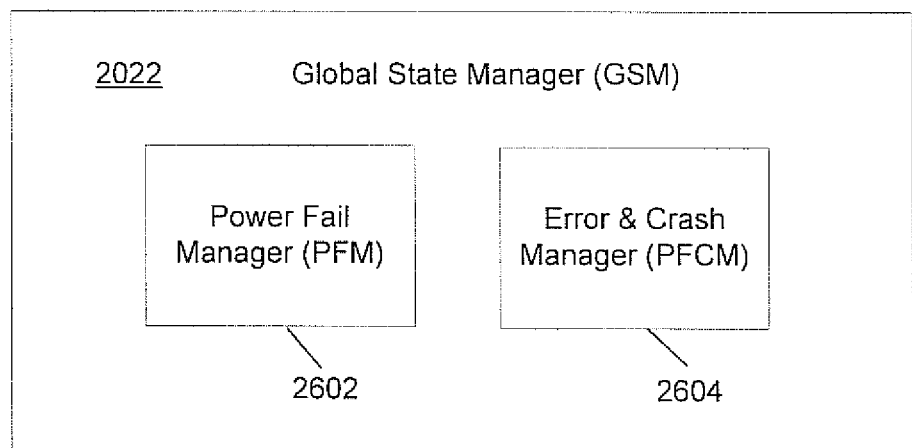
FIG. 26 is a schematic view illustrating a global state manager (GSM) that can be implemented by a multimode storage management system in accordance with an embodiment of the present invention.

Referring to FIG. 26, a global state manager (GSM) 2022 includes a power fail manager (PFM) 2602 and an error and crash manager (PFCM) 2604.

The functions of the multimode storage management systems 1802, 1902, and 2002 of FIGS. 18, 19, and 20 can be implemented by the storage system 1602 of FIG. 16. In alternative embodiments, the functions of the multimode storage management systems 1802, 1902, and 2002 may be implemented by a general computing device or by specialized hardware. The presented multimode approaches include variety of features and characteristics that facilitate effective and efficient storage of information. The features and characteristics can be leveraged to improve many different aspects of performance. In one embodiment, the flexibility of the described partitioning approaches allows realization of relatively fast speed and manageable complexity. The relatively large amounts of user data are stored in a SUE address space that enables very fast storage and management operations for the user data. While the relatively small amounts of metadata are stored in a logically addressed area allowing the system to leverage the abstraction nature of the metadata utilized for complexity reduction. In addition, the flexibility of increasing the over provisioning of the relatively smaller metadata region gives a much larger percentage over provisioning impact that helps speed up the metadata storage operations and compensate for the complexity reduction speed impact that would otherwise occur. This allows better overall allocation and comparative impact of over-provisioning resources. The flexibility can also facilitate improved life cycle preservation by allowing different storage regions of blocks to be re-assigned or re-allocated between the two partitions. The nature of the data stored in a region may mean it is written/erased less than another region (e.g., most of the metadata does not change much compared to the user data) and a physical block in one partition can be re-assigned to another partition to even out wear and tear on a particular region. The flexibility also allows power cycling improvement by moving the power cycling responsibility up to the system level.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, or process, is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices) into other data similarly represented as physical quantities within other components.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:

1. A storage system comprising:
a storage device having a plurality of dies, the plurality of dies including a first plurality of dies and a second plurality of dies, each die of the plurality of dies having a plurality of blocks of memory cells, each block of memory cells having a memory block address and a plurality of pages of memory cells, each page of memory cells having a memory page address; and
a system controller coupled to the storage device, the system controller to:
receive a plurality of user logical block addresses and data associated with each user logical block address, the data to be stored in a metapage that has a number of pages of memory cells in a corresponding number of blocks of memory cells in a corresponding number of dies; and
map the plurality of user logical block addresses into a plurality of selective underlying exposure (SUE) addresses such that a number of different user logical block addresses are mapped to each SUE address, the plurality of SUE addresses addressing the first plurality of dies such that each SUE address addresses a different die,
wherein the system controller receives and forwards a plurality of metadata logical block addresses and metadata associated with each metadata logical block address, and wherein the storage device further has a logical interface to receive forwarded metadata logical block addresses and metadata associated with each forwarded metadata logical block address, and to translate the forwarded metadata logical block addresses into corresponding memory block addresses.

2. The storage system of claim 1, wherein a SUE address includes a die address, a SUE block address, and a SUE page address.

3. The storage system of claim 2, wherein the storage device further has a SUE interface that translates a SUE block address into a memory block address, and a SUE page address into a memory page address.

4. The storage system of claim 3, wherein the system controller to further combine a plurality of logically-addressed blocks to create a plurality of SUE addressable units.

5. The storage system of claim 4, wherein the system controller to further:
compress the plurality of SUE addressable units into a plurality of compressed SUE addressable units and a corresponding plurality of headers such that each compressed SUE addressable unit has a header;

place the plurality of compressed SUE addressable units and the corresponding plurality of headers into a plurality of transfer blocks; and aligning an integral number of transfer blocks to a SUE page, the SUE page having a SUE page address.

6. The storage system of claim 5 wherein the metapage is one of a plurality of metapages within a metablock.

7. The storage system of claim 6 wherein the system controller to further generate a metablock that includes a plurality of SUE blocks, each SUE block including a plurality of SUE pages, each SUE page having a SUE address.

8. A method of operating a storage system, the method comprising:

receiving a plurality of user logical block addresses and data associated with each user logical block address, the data to be stored in a metapage that has a number of pages of memory cells in a corresponding number of blocks of memory cells in a corresponding number of dies;

mapping the plurality of user logical block addresses into a plurality of selective underlying exposure (SUE) addresses such that a number of different user logical block addresses are mapped to each SUE address, the plurality of SUE addresses addressing a first plurality of dies such that each SUE address addresses a different die, wherein a SUE address includes a die address, a SUE block address, and a SUE page address;

translating a SUE block address into a memory block address, and a SUE page address into a memory page address;

combining a plurality of logically-addressed blocks to create a plurality of SUE addressable units;

compressing the plurality of SUE addressable units into a plurality of compressed SUE addressable units and a corresponding plurality of headers such that each compressed SUE addressable unit has a header;

placing the plurality of compressed SUE addressable units and the corresponding plurality of headers into a plurality of transfer blocks; and aligning an integral number of transfer blocks to a SUE page, the SUE page having a SUE address.

9. The method of claim 8, further comprising receiving and forwarding a plurality of metadata logical block addresses and metadata associated with each metadata logical block address.

10. The method of claim 9, further comprising translating the plurality of metadata logical block addresses into corresponding physical memory block address.

11. The method of claim 8, wherein the metapage is one of a plurality of metapages within a metablock.

12. The method of claim 8, further comprising generating a metablock that includes a plurality of SUE blocks, each SUE block including a plurality of SUE pages, each SUE page having a SUE address.

13. The method of claim 12, wherein the storage device is one of a plurality of storage devices coupled to the system controller.

14. A method for managing storage media in an array of storage devices associated with a storage system, the method comprising:

mapping, with a processor, user data into a selective underlying exposure (SUE) address space that corresponds to a representative geometry of a physical storage area in the array of storage devices associated with the storage system; and mapping a plurality of logical addresses associated with the user data into a metablock of addresses in the SUE address space, the metablock corresponding to multiple physical blocks of memory cells that are jointly managed as a unit in each of the storage devices in the array, wherein the multiple physical blocks of memory cells in each of the storage devices correspond to a separate SUE block of addresses in the SUE address space.

15. The method of claim 14, wherein mapping the user data into the SUE address space further comprises mapping a subset of the plurality of logical addresses associated with the user data into a meta page of addresses in the metablock, the metapage corresponding to a SUE page of each separate SUE block.

16. A non-transitory computer-readable medium having instructions stored thereon which, when executed by a processor, causes the processor to execute a method of operating a storage system, the method comprising:

receiving a plurality of user logical block addresses and data associated with each user logical block address, the data to be stored in a metapage that has a number of pages of memory cells in a corresponding number of blocks of memory cells in a corresponding number of dies;

mapping the plurality of user logical block addresses into a plurality of selective underlying exposure (SUE) addresses such that a number user logical block addresses are mapped into each SUE address, the plurality of SUE addresses addressing a first plurality of dies such that each SUE address addresses a different die, wherein a SUE address includes a die address, a SUE block address, and a SUE page address;

translating a SUE block address into a memory block address, and a SUE page address into a memory page address;

combining a plurality of logically-addressed blocks to create a plurality of SUE addressable units;

compressing the plurality of SUE addressable units into a plurality of compressed SUE addressable units and a corresponding plurality of headers such that each compressed SUE addressable unit has a header;

placing the plurality of compressed SUE addressable units and the corresponding plurality of headers into a plurality of transfer blocks; and aligning an integral number of transfer blocks to a SUE page, the SUE page having a SUE address.

17. The method of claim 16, further comprising receiving and forwarding a plurality of metadata logical block addresses and metadata associated with each metadata logical block address.

18. A system for managing storage media in an array of storage devices associated with a storage system, the system comprising:

a memory that stores machine instructions; and a processor that executes the machine instructions in order to:

map user data into a selective underlying exposure (SUE) address space that corresponds to a representative geometry of a physical storage area in the array of storage devices associated with the storage system;

map a plurality of logical addresses associated with the user data corresponding to multiple physical blocks of memory cells that are jointly managed as a unit in each of the storage devices in the array into a metablock of SUE addresses in the SUE address space;

map each subset of the SUE addresses corresponding to multiple physical blocks of memory cells that are jointly managed as a unit in each individual storage device in the array into a SUE block of SUE addresses associated with the metablock;

map each subset of the SUE addresses corresponding to a respective physical page in each of the multiple physical blocks of memory cells that are jointly managed as a unit in each individual storage device in the array into a respective SUE page of SUE addresses associated with each SUE block; and map each subset of the SUE addresses corresponding to the respective SUE page of each SUE block into a metapage of addresses associated with the metablock.

* * * * *